US008265326B2

(12) United States Patent
Singh

(10) Patent No.: US 8,265,326 B2
(45) Date of Patent: *Sep. 11, 2012

(54) HAND-HELD, PORTABLE ELECTRONIC DEVICE WITH RETAINER PORT FOR RECEIVING ONE OR MORE ATTACHABLE WIRELESS AUDIOPHONES FOR IN SITU CHARGING

(76) Inventor: Sanjeev Kumar Singh, Danbury, CT (US)

( * ) Notice: Subject to any disclaimer, the term of this patent is extended or adjusted under 35 U.S.C. 154(b) by 1236 days.

This patent is subject to a terminal disclaimer.

(21) Appl. No.: 12/017,169

(22) Filed: Jan. 21, 2008

(65) Prior Publication Data
US 2008/0224659 A1 Sep. 18, 2008

Related U.S. Application Data

(63) Continuation-in-part of application No. 11/686,207, filed on Mar. 14, 2007.

(51) Int. Cl.
*H04R 25/00* (2006.01)
*H04M 1/00* (2006.01)
(52) U.S. Cl. ............... 381/374; 379/433.02; 455/569.1
(58) Field of Classification Search .......... 381/370, 381/374, 376, 311, 334; 455/569.1, 575.2; 379/433.02, 433.03, 433.1, 434
See application file for complete search history.

(56) References Cited

U.S. PATENT DOCUMENTS

| 5,590,417 | A | * | 12/1996 | Rydbeck | 455/575.2 |
| 6,118,882 | A | * | 9/2000 | Haynes | 381/374 |
| 2005/0059344 | A1 | * | 3/2005 | Chang | 455/41.1 |
| 2007/0291973 | A1 | * | 12/2007 | Neu et al. | 381/334 |

* cited by examiner

*Primary Examiner* — Curtis Kuntz
*Assistant Examiner* — Sunita Joshi
(74) *Attorney, Agent, or Firm* — Sanjeev K. Singh

(57) ABSTRACT

A hand-held, portable electronic device is provided with a retainer port for removably receiving one or more attachable wireless audiophones for in situ charging of at least one of a first or second attachable wireless audiophone on the hand-held, portable electronic device. In one embodiment of the present invention, a retainer port configured to mate with a first connector of a first attachable wireless audiophone including at least one of a speaker or a microphone at a hand-held, portable electronic device having a device housing with a surface is provided. The retainer port may comprise at least one of a first or a second port socket configured for removably retaining the first attachable wireless audiophone on the hand-held, portable electronic device. The first port socket to communicatively receive the first connector of the first attachable wireless audiophone for in situ charging thereof when the hand-held, portable electronic device is connected to an electrical power source for recharging. The hand-held, portable electronic device includes a first transceiver adapted to communicate with the first attachable wireless audiophone over a short-range wireless communication link. The first attachable wireless audiophone may include a second transceiver adapted to communicate with the hand-held, portable electronic device using the short-range wireless communication link. A single charger may charge a device battery of the hand-held, portable electronic device and a battery of one or more attachable wireless audiophones in situ.

20 Claims, 15 Drawing Sheets

HAND-HELD, PORTABLE ELECTRONIC DEVICE WITH RETAINER PORT FOR RECEIVING ONE OR MORE ATTACHABLE WIRELESS AUDIOPHONES FOR IN SITU CHARGING

CROSS REFERENCE TO RELATED APPLICATIONS

This application is a continuation-in-part of U.S. patent application Ser. No. 11/686,207, filed on Mar. 14, 2007 and entitled, "A HAND-HELD, PORTABLE ELECTRONIC DEVICE WITH A RETAINER PORT FOR REMOVABLY COUPLING AN ATTACHABLE WIRELESS AUDIOPHONE THERETO"

BACKGROUND OF THE INVENTION

1. Field of the Invention

This invention relates generally to hand-held, portable electronic devices, and more particularly, to providing an audiophone retainer for headphone(s) and/or microphone using a hand-held, portable electronic device.

2. Description of the Related Art

Increasingly use to hand-held, portable electronic devices, such as a processor or controller based devices including hand-held, portable computers, hand-held multi-media players, music players, cellular phones, hand-held wired and/or wireless communication and/or computing devices, hand-held pocket computers, and personal digital assistants is becoming widely popular. As a result, use and exchange of electronic entertainment content and information is not only a trend anymore but a norm and a convenient way of experiencing multi-media content such as music and video, conveying information including electronic mail messages between users of wired and/or mobile communication devices. Many commercial enterprises, media service providers or network operators, Internet service providers and businesses use Internet to disseminate electronic multi-media content (textual, graphic, music and video files) over a connected mesh of wired and/or wireless network users. For example, several of these entities usually provide access to multi-media content and services on the Internet via websites and web browsers.

Users of the hand-held, portable electronic devices obtain and store a variety of electronic multi-media content such as music and video files on their hand-held, portable devices. Likewise, users of networked devices wired and/or wireless exchange electronic messages to communicate with other users. To use the hand-held, portable electronic devices, an audiophone comprising headphone(s) and/or microphone is provided for users. In general, for listening to electronic multi-media content such as music and video files, a pair of stereo headphones is provided with the hand-held, portable electronic devices. For the hand-held, portable networked, wired and/or wireless communication and/or computing devices, a headphone with a microphone is provided. Examples of headphones and/or microphones include a wired or a wireless set of audio devices.

While the wireless headphones and/or microphones comprise a headphone and/or a microphone, the wired headphone (s) and/or microphone comprise a pair of stereo audio cords with a set of micro headphones at one end and an audio male connector pin on the other end, both face a similar set of issues relating to their storage for reuse, i.e., when not being used by users. In particular, the audio cords are a few feet long so that a user can conveniently use the headphones and/or microphones. Since these audio cords are relatively soft and flexible they get entangled when the headphones and/or microphones are not being used. That is, storage of the headphones and/or microphones with a relatively long and flexible audio cord with headphone speaker(s) attached to its end is a messy affair. With regard to the wireless headphones and/or microphones, because of their wireless convenience it is relatively easy to misplace, damage, or loose them when they are not being in use. In this manner, storage for reuse of both the wired and/or wireless headphones and/or microphones of the hand-held, portable electronic devices becomes quite a challenge when an audiophone is not put to use by wireless users or it discharges rather quickly due to a constant use and need frequent recharging.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a retainer port configured to mate with a first connector of a first attachable wireless audiophone including at least one of a speaker or a microphone at a hand-held, portable electronic device having a device housing with a surface is provided. The retainer port may comprise at least one of a first or a second port socket configured for removably retaining the first attachable wireless audiophone on the hand-held, portable electronic device. The first port socket to communicatively receive the first connector of the first attachable wireless audiophone for in situ charging thereof when the hand-held, portable electronic device is connected to an electrical power source for recharging. The hand-held, portable electronic device includes a first transceiver adapted to communicate with the first attachable wireless audiophone over a short-range wireless communication link. The first attachable wireless audiophone may include a second transceiver adapted to communicate with the hand-held, portable electronic device using the short-range wireless communication link.

In another embodiment of the present invention, a hand-held, portable electronic device with a device housing having a surface is provided for receiving a first attachable wireless audiophone including at least one of a speaker or a microphone. The hand-held, portable electronic device may comprise a retainer port configured to mate with a first connector of the first attachable wireless audiophone for securely holding the attachable wireless audiophone at the hand-held, portable electronic device. The retainer port may include at least one of a first or a second port socket configured for removably retaining the first attachable wireless audiophone on the hand-held, portable electronic device. The first port socket to communicatively receive the first connector of the first attachable wireless audiophone. The hand-held, portable electronic device may further comprise charger circuitry coupled to the at least one of the first or the second port socket for in situ charging of the first attachable wireless audiophone when the hand-held, portable electronic device is connected to an electrical power source for recharging.

BRIEF DESCRIPTION OF THE DRAWINGS

The invention may be understood by reference to the following description taken in conjunction with the accompanying drawings, in which like reference numerals identify like elements, and in which.

Figure 1:
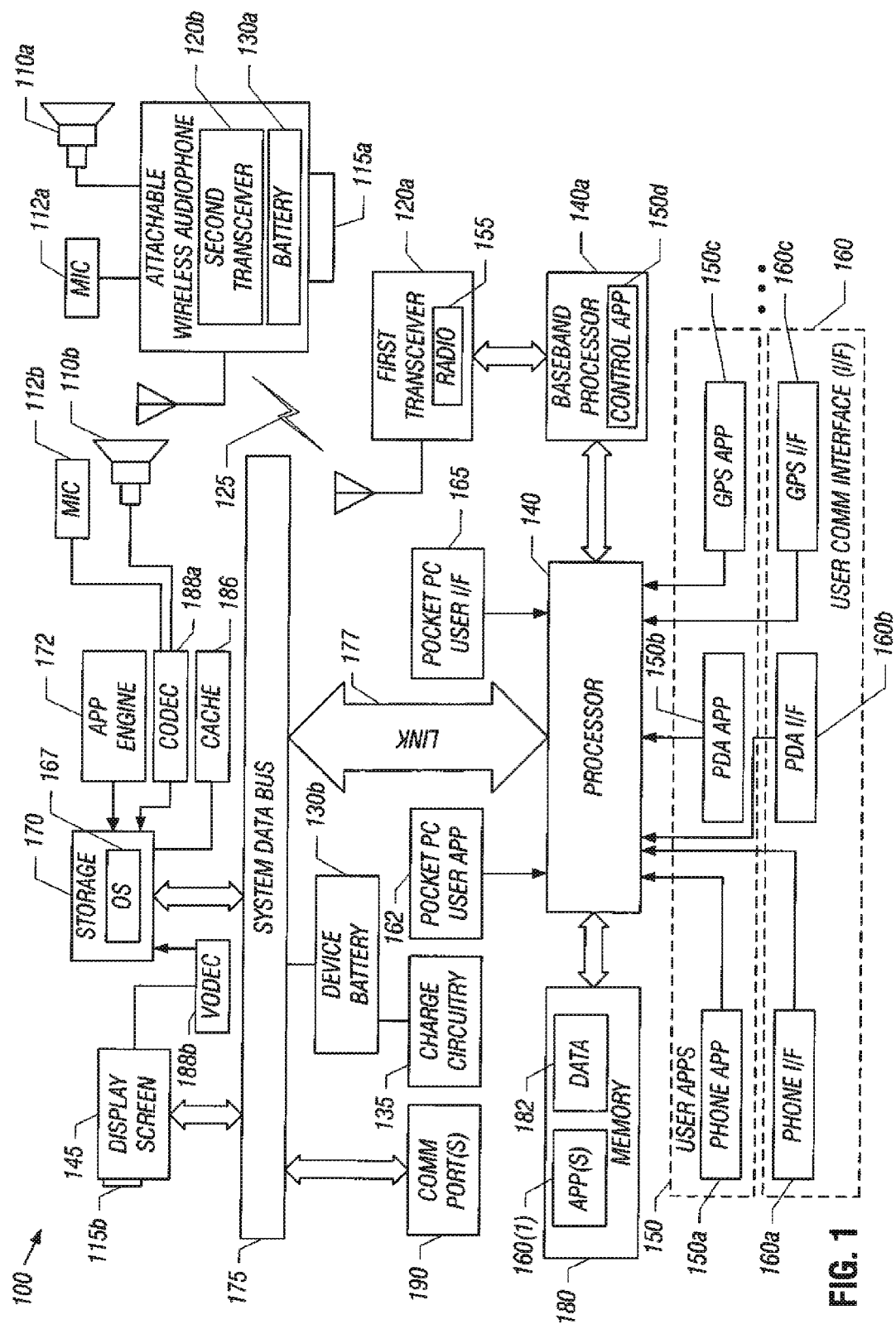
FIG. 1 schematically illustrates a hand-held, portable electronic device including a retainer assembly to detachably retain an attachable wireless audiophone including at least one speaker and a microphone with the hand-held, portable electronic device using a device housing having a surface in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a method and an apparatus are provided for retaining an attachable wireless audiophone on a hand-held, portable electronic device for storage, reuse and/or in situ charging. For example, a cell phone may comprise a retainer port to receive a connector of a Bluetooth wireless headset to couple it to the cell phone for securely hold the Bluetooth wireless headset therewith. In one embodiment of the present invention, a retainer port may detachably retain an attachable wireless audiophone including at least one speaker and a microphone with a hand-held, portable electronic device using a device housing having a surface. For removably receiving the attachable wireless audiophone on the hand-held, portable electronic device the retainer port may comprise a retainer assembly including at least a first portion of the surface of the device housing configured to securely hold at least a second portion of the attachable wireless audiophone at the hand-held, portable electronic device. The hand-held, portable electronic device may include a first transceiver adapted to communicate with the attachable wireless audiophone over a wireless communication link. The attachable wireless audiophone may include a second transceiver adapted to communicate with the hand-held, portable electronic device using the wireless communication link. In another embodiment of the present invention, a method is provided for providing a retainer assembly to retain an attachable wireless audiophone including at least one speaker and a microphone on a hand-held, portable electronic device having a device housing with a surface. The method comprises forming at least a first portion of the surface of the device housing. The first portion of the surface is configured for removably receiving the attachable wireless audiophone on the hand-held, portable electronic device by securely holding at least a second portion of the attachable wireless audiophone at the hand-held, portable electronic device. The hand-held, portable electronic device includes a first transceiver adapted to communicate with the attachable wireless audiophone over a wireless communication link. The attachable wireless audiophone includes a second transceiver adapted to communicate with the hand-held, portable electronic device using the wireless communication link.

As one example, a cell phone may removably receive a portion of a wireless headset in a retainer port on the cell phone housing for holding and/or in situ charging the wireless headset, such as a Bluetooth wireless headset. Both the cell phone and the wireless headset may include a battery, respectively. A shared or common charger may charge the battery of the cell phone and the battery of the wireless headset in situ. In this way, a retainer port may use a retainer assembly to removably retain an attachable wireless audiophone capable of coupling for communicating with a hand-held, portable electronic device as a pair together for storage, reuse and/or in situ charging. As another example, by using the surface of the housing and/or body of an audio music player, an audiophone retainer assembly may removably store an attachable wireless headset or audiophone along with an audio music player capable of storing and playing MP3 music files. Accordingly, the retainer assembly may enable externally storage of the wireless headset over the surface of the audio music player or cell phone housing and/or internally on the body of the audio music player or cell phone.

Referring to FIG. 1, a hand-held, portable electronic device 100 that may removably retain an attachable wireless audiophone 105 is illustrated according to one embodiment of the present invention. The attachable wireless audiophone 105 may be capable of coupling to the hand-held, portable electronic device 100 and enable communications therewith. The attachable wireless audiophone 105 may include one or more headphone(s). By using a device housing having a surface of the hand-held, portable electronic device 100, in accordance with one embodiment of the present invention, the hand-held, portable electronic device 100 may detachably retain, for example, the attachable wireless audiophone 105.

Examples of the hand-held, portable electronic device 100 include consumer electronics products such as a processor or controller based devices including hand-held, portable computers, hand-held multi-media players, music players, cellular phones, hand-held wired and/or wireless communication and/or computing devices, hand-held pocket computers, and personal digital assistants (PDAs), a game player, a video player, a video recorder, a camera, an image viewer and the like. A hand-held device may be sized for placement into a pocket or hand of the user and no reference surface such as a desktop is desired to operate it. By being hand-held, the hand-held, portable electronic device 100 is relatively small and easily handled and utilized by its user. Unlike a laptop computer, by being portable it is pocket sized; the user may carry the hand-held, portable electronic device 100 in hand and avoid carrying a relatively large bag for a bulky and often heavy device. A battery (not shown), an AC adapter, or a vehicle adapter may power the hand-held, portable electronic device 100. Since the hand-held, portable electronic device 100 is battery operated and highly portable, a user may listen to music, play games or video, record video or take pictures or wirelessly communicate wherever the user travels.

The attachable wireless audiophone 105 may include at least one speaker 110a and a microphone 110b coupled to a connector 115a. The hand-held, portable electronic device 100 may include a connector port 115b to mate with the connector 115a. Examples of the connector 115a and the connector port 115b include a pair of conventional male and female power charging pin and a receptacle or a Universal Serial Bus (USB) plug and play interface between the hand-held, portable electronic device 100 and the attachable wireless audiophone 105. The attachable wireless audiophone 105 may comprise conventional stereo headphones and a conventional speaker phone.

The hand-held, portable electronic device 100 may include a first transceiver 120a adapted to communicate with the attachable wireless audiophone 105 over a wireless communication link 125. The attachable wireless audiophone 105 may include a second transceiver 120b adapted to communicate with the hand-held, portable electronic device 100 using the wireless communication link 125. While the first transceiver 120a may be a cellular communication transceiver, the second transceiver 120b may be a short range wireless transceiver, such as based on Bluetooth protocol. The hand-held, portable electronic device 100 may use the first transceiver 120a for wireless communications. For example, within a cellular transceiver, another short-range Bluetooth transceiver may be provided to communicate with the attachable wireless audiophone 105 and/or a wired or wireless access point. The attachable wireless audiophone 105 may be a headset configured for consumer wearing by a wireless user. The second transceiver 120b of the attachable wireless audiophone 105 may be adapted to communicate with the first transceiver 120a of the hand-held, portable electronic device 100 using a Bluetooth protocol for a short-range wireless communication associated with the wireless user.

Unlike a conventional wireless Bluetooth headset that may need a separate charger to be connected via a port, the attachable wireless audiophone 105 may be charged in situ when the hand-held, portable electronic device 100 is coupled for charging. While the attachable wireless audiophone 105 may comprise a battery 130a, the hand-held, portable electronic device 100 may comprise a device battery 130b and an associated charge circuitry 135. By using the charge circuitry 135 provided for charging the device battery 130b in situ at the hand-held, portable electronic device 100, the battery 130a of the attachable wireless audiophone 105 may be charged in situ from the hand-held, portable electronic device 100 without having to recharge it separately. Alternatively, a separate charging circuit may be provided for in situ charging the battery 130a of the attachable wireless audiophone 105.

In accordance with one embodiment of the present invention, the hand-held, portable electronic device 100 may include a processor 140 that may control the overall operation of the hand-held, portable electronic device 100. The hand-held, portable electronic device 100 may comprise a display screen 145. The processor 140 may be configured to run user applications (APPS) 150 and send outputs of the user applications 150 to the display screen 145. The display screen 145 may provide a touch sensitive screen for display of Operating System prompts, buttons, icons, application screens, and other data, and for providing user inputs via tapping or touching (or drawing in an area) via a stylus or other touch mechanism.

Consistent with the illustrative embodiment of the present invention, the user applications 150 may include a phone application (APP) 150a, a Personal Digital Assistant (PDA) application (APP) 150b, and a Global Positioning System (GPS) application (APP) 150c. The phone application 150a may be configured to capture user inputs for telephone related operations and display current telephone operations information on the display screen 145. The PDA application 150b may be configured to capture user inputs for PDA related operations and display current PDA operations information on the display screen 145. The GPS application 150c may be configured to capture user inputs for location related operations and display current location operations information on the display screen 145.

According to one illustrative embodiment of the present invention, the hand-held, portable electronic device 100 may further include a baseband processor 140a connected to the processor 140 and configured to control operations of a radio device 155 at the first transceiver 120a. The radio device 155 may provide connectivity to a cellular telephone network (not shown). The hand-held, portable electronic device 100 may comprise a user communication (COMM) interface (I/F) 160 that may communicate user inputs and selections to the processor 140 and the baseband processor 140a for the user APPS 150. The user COMM I/F 160 may include a phone interface (I/F) 160a for enabling the phone APP 150a. Likewise, user COMM I/F 160 may include a PDA interface (I/F) 160b for enabling the PDA APP 150b and may further include a GPS interface (I/F) 160c for enabling the GPS APP 150c.

For the purposes of enabling a user of the hand-held, portable electronic device 100 to interact with the hand-held, portable electronic device 100, the user COMM I/F may take a variety of forms including a button(s), keypad, joy stick, touch screen button(s), and dial(s). For example, the user COMM I/F 160 may include physical hard push buttons and switches located on a body of the hand-held, portable electronic device 100 and provide signals to the user applications 150 running on the processor 140 and/or a telephone control application (APP) 150d executing on the baseband processor 140a.

Consistent with one exemplary embodiment of the present invention, the hand-held, portable electronic device 100 may comprise a hand-held or pocket personal computer (PC) application (APP) 162 that includes cell phone technology. The pocket PC APP 162 uses a pocket PC user interface (I/F) 165 for executing computer applications using an operating system (OS) 167 at the hand-held, portable electronic device 100. The hand-held, portable electronic device 100 may comprise storage 170 for storing the operating system 167, data, and the computer applications. The storage 170 may store an application engine 172 to execute the user APPS 150. A user may store a plurality of media items (e.g., songs) in a file system at the storage 170.

The hand-held, portable electronic device 100 may utilize a system data bus 175 to transfer programs and data from the storage 170 to the processor 140, as illustrated by one embodiment of the present invention. Over a link 177, the system data bus 175 may carry data and commands to/from the processor 140 from/to other devices within the hand-held, portable electronic device 100. For example, the user applications 150 running on the hand-held, portable electronic device 100 send application screens and other data outputs to the display screen 145 for display via the system data bus 175. User inputs may be detected by the display screen 145 and sent to the processor 140 on the link 177 via the system data bus 175.

Consistent with one embodiment, the storage 170 may comprise a storage disk or a plurality of disks to provide high capacity storage capability for the hand-held, portable electronic device 100. However, portion of the operating system 167 of the hand-held, portable electronic device 100 may be stored on a non-volatile semiconductor memory device 180 such as FLASH memory. An example of the memory device 180 is a semiconductor memory such as Random-Access Memory (RAM). In the memory device 180, the hand-held, portable electronic device 100 may store executables for executing applications (APPS) 160(1) and associated media content data 182 pertaining to multi-media items in a file system and a cache 186. Examples of the media content data 182 include electronic entertainment content and information such as music, video, electronic mail messages.

The system data bus 175 may internally couple the cache 186, a coder/decoder (CODEC) 188a, and a video coder/decoder (VODEC) 188b within the hand-held, portable electronic device 100 to the processor 140 for transferring data therebetween. At the hand-held, portable electronic device 100, the CODEC 188a may be coupled to the storage 170, which may, in turn, couple a device speaker 110b and a device microphone 112b to the system data bus 175. The hand-held, portable electronic device 100 may include one or more communication (COMM) port(s) 190 including a Universal Serial Bus (USB) port and a power and/or charging port. Using the COMM port(s) 190, for example, the hand-held, portable electronic device 100 may interface with external devices, such as computers or a base unit.

The hand-held, portable electronic device 100 may interface with computers, commercial enterprises, media service providers or network operators, Internet service providers and businesses using Internet to obtain and/or disseminate electronic multi-media content (textual, graphic, music and video files) over a connected mesh of wired and/or wireless network users. For example, a user of the hand-held, portable electronic device 100 may access multi-media content and services wirelessly or on wired communication medium on the Internet via websites and web browsers.

For illustrative purposes, in one embodiment, the hand-held, portable electronic device 100 may communicate over a communications system that may be a digital cellular network, although it should be understood that the present invention may be applicable to other systems that support data and/or voice communication. The communications system may allow the hand-held, portable electronic device 100 to communicate with a data network, such as the Internet, through one or more base stations (BTS). The hand-held, portable electronic device 100 may take the form of any of a variety of devices capable of accessing the data network through the BTS. In one embodiment, a plurality of the BTSs may be coupled to a Radio Network Controller (RNC) by one or more connections, such as T1/E1 lines or circuits, ATM circuits, cables, optical digital subscriber lines (DSL's), and the like. Generally, the RNC operates to control and coordinate the BTSs to which it is connected. The RNC is, in turn, coupled to a controller (CN) via a connection, which may take on any of a variety of forms, such as T1/E1 lines or circuits, ATM circuits, cables, optical digital subscriber lines, and the like.

The data network may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like. As utilized herein, a "data network" may refer to one or more communication networks, channels, links, or paths, and systems or devices (such as routers) used to route data over such networks, channels, links, or paths. It should be understood that the configuration of the communications system may include a network management system (not shown) that provides operation, administration, maintenance, and provisioning functions for a cellular network.

In other embodiments, Bluetooth may enable the hand-held, portable electronic device 100 to communicate over wireless personal area networks (PANs). Bluetooth provides a way to connect and exchange information between devices such as mobile phones, laptops, PCs, printers, digital cameras and video game consoles via a secure, globally unlicensed short-range radio frequency. By using short-range radio frequencies Bluetooth may enable two or more devices, for example, the hand-held, portable electronic device 100 to communicate with another device in close proximity. For example, the audiophone 205 may be a Bluetooth headset capable of transferring files from phones/PDAs to computers. The Bluetooth specification is available from Bluetooth Special Interest Group (SIG) or as IEEE standard 802.15.1. Alternatively, Wi-Fi may be used in the hand-held, portable electronic device 100 to communicate on the same radio frequencies as Bluetooth, but with higher power consumption resulting in a stronger connection. Wi-Fi is sometimes called "Wireless Ethernet". Bluetooth and/or Wi-Fi may be used in the hand-held, portable electronic device 100 within offices, homes and on the move by setting up networks, printing, or transferring presentations and files from PDAs to computers.

In operation, a user of the hand-held, portable electronic device 100 such as a media player may display a list of available media items on the display screen 145 to play a particular media item. By using the user COMM I/O interface 160, a user can select one of the available media items. The processor 140, upon receiving a selection of a particular media item, supplies the media data (e.g., audio file) for the particular media item to the CODEC 188a. The CODEC 188a then produces analog output signals for the speaker 110b. The speaker 110b can be a speaker internal to the hand-held, portable electronic device 100 or external to the hand-held, portable electronic device 100. For example, headphones or earphones that connect to the hand-held, portable electronic device 100 would be considered an external speaker. Accordingly, the processor 140 controls the playing of the particular media item such that upon receiving the user's selection of the particular media item, such as music file in Moving Picture Experts Group (MPEG)-1 Audio Layer 3 (MP3) format or MPEG-4 format based on International Organization for Standardization (ISO)/International Electro-technical Commission (IEC) JTC1/SC29 WG11 standard or M-JPEG used by Internet Protocol (IP) based video cameras via Hypertext Transfer Protocol (HTTP) streams by using multipart and/or mixed content type.

Consistent with one embodiment, the video coder/decoder (VODEC) 188b may be likewise included in the hand-held, portable electronic device 100 to play video items or image files, such as a video file in Windows Media Format (*.wma file) or in a Joint Photographic Experts Group (JPEG) based on JPEG 2000: Image Compression Standards available from International Organization for Standardization (ISO) or MPEG format, or DivX Media Format (*.divx). Another example is a (*.wav), short for Waveform audio format that is a Microsoft and IBM audio file format standard for storing audio on personal computers (PCs). Other examples include the Resource Interchange File Format (RIFF) bit stream format for storing data in "chunks," the Interchange File Format (IFF) and the Audio Interchange File Format (AIFF) format used on Apple Macintosh computers.

Consistent with one embodiment, a set of base stations may provide wireless connectivity to the hand-held, portable electronic device 100 according to a desirable communication protocol. Examples of a communication protocol include a code division multiple access (CDMA, CDMA2000) protocol, wideband-CDMA (WCDMA) protocol, a Universal Mobile Telecommunication System (UMTS) protocol, a Global System for Mobile communications (GSM) protocol, and like. For example, the hand-held, portable electronic device 100 as a smart phone, text messaging device, and the like may employ a spread spectrum cellular system to operate in a high-speed wireless data network, such as a digital cellular CDMA network.

Figure 2:
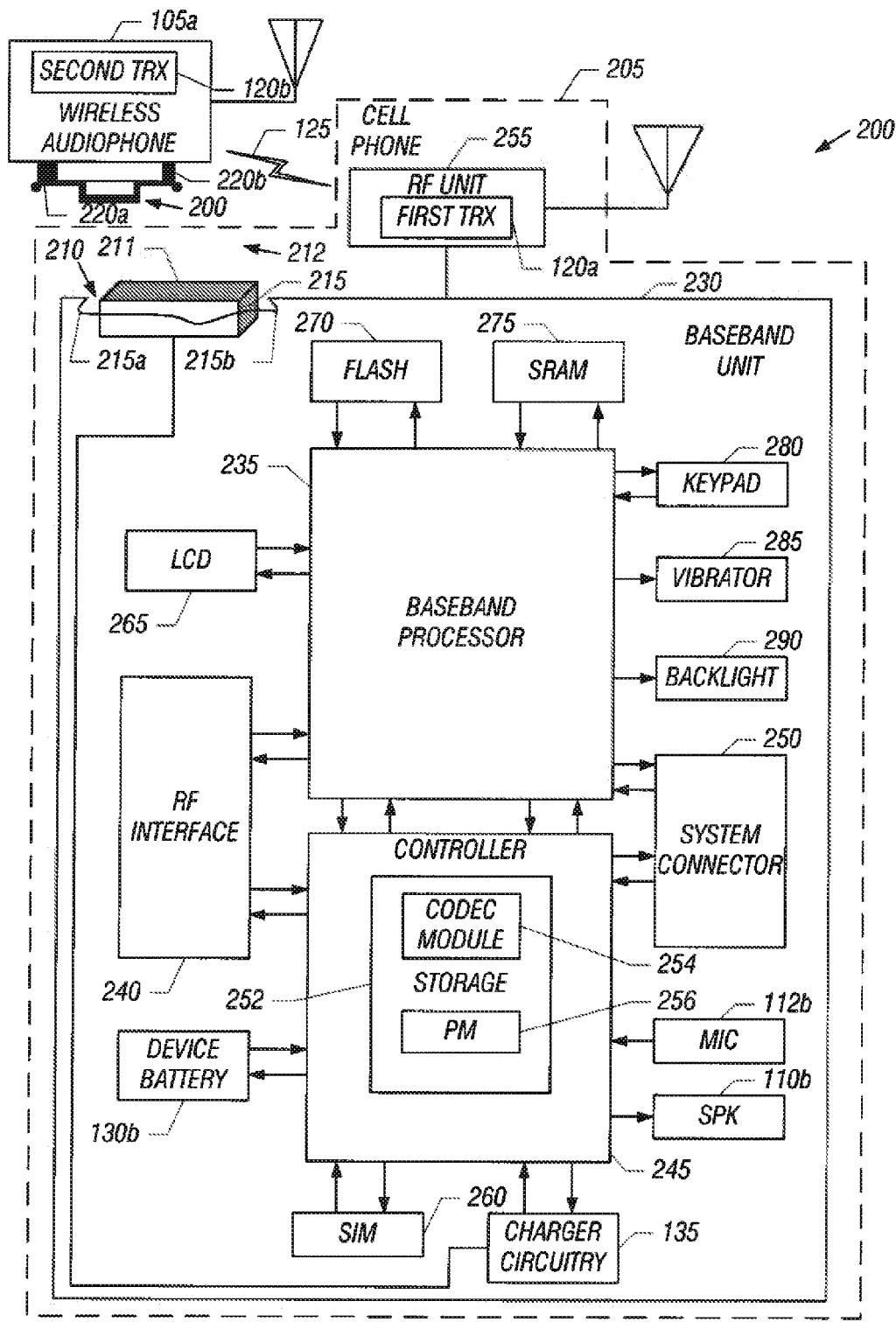
FIG. 2 schematically illustrates a hand-held, portable electronic device with a retainer port including a retainer assembly in accordance with one embodiment of the present invention.

Referring to FIG. 2 a hand-held, portable electronic device, such as a cell phone 200 is schematically illustrated with a retainable wireless audiophone 105a capable of attaching to a cell phone housing 205, in accordance with one embodiment of the present invention. The cell phone housing 205 may removably retain the retainable wireless audiophone 105a capable of wirelessly coupling to communicate with the cell phone 200. The cell phone housing 205 having a surface 210 may removably receive the retainable wireless audiophone 105a for holding together as a mating pair with the cell phone 200.

In one embodiment, the cell phone 200 may comprise a retainer port 211 that uses a retainer assembly 212 to removably couple the retainable wireless audiophone 105a to the cell phone housing 205. The retainer assembly 212 may comprise at least a first portion 215a-215b of the surface 210 of the cell phone housing 205 may be configured for removably receiving retainable wireless audiophone 105a on the cell phone 200. To latch itself with the cell phone housing 205, for providing the retainer assembly 212, the retainable wireless audiophone 105a may comprise at least a second portion 220a-220b. Examples of the first portion 215a-215b of the surface 210 of the cell phone housing include a cavity 215 having a pair of hollow bubbles so shaped to receive a corresponding solid bubble pair, respectively. Examples of the second portion 220a-220b of the retainable wireless audiophone 105a include a plug 220 having a pair of solid bubbles capable of snugly latching to the corresponding hollow bubble shaped to receive a respective solid bubble of the pair of solid bubbles. However, persons of an ordinary skill would appreciate that the retainer assembly 212 may be formed of many known shapes and structures by having the benefit of this instant disclosure based on one or more factors including a desired application and its operation, location on the cell phone 200. For example, an arrangement of the retainer assembly 212 may comprise the plug 220 and cavity 215. This arrangement may use a known stylus and an associated receptacle structure to securely receive and retain the retainable wireless audiophone 105a with the cell phone housing 205 at the cell phone 200 by using a mating wedge or tapered forms for the plug 220 and a hollow cone-shaped or wedge-shaped receptacle for the cavity 215 instead of the bubbles based configuration.

The first portion 215a-215b of the surface 210 of the cell phone housing 205 may securely hold at least the second portion 220a-210b of the retainable wireless audiophone 105a at the cell phone 200. While the cell phone 200 may include the first transceiver (TRX) 120a adapted to communicate with the retainable wireless audiophone 105a over the wireless communication link 125, the retainable wireless audiophone 105a may include the second transceiver (TRX) 120b adapted to communicate with the cell phone 200 using the wireless communication link 125.

Consistent with one embodiment, the cell phone 200 may comprise a conventional radio frequency (RF) unit 225. The RF unit 225 may include the first transceiver (TRX) 120a to communicate with the retainable wireless audiophone 105a over the wireless communication link 125. Examples of the RF unit 225 include a transceiver based on one or more communication protocols including Bluetooth, Wi-Fi, CDMA, WCDMA, GSM, and General Packet Radio Service (GPRS), a packet-based air interface for radio transmission of data, usually between mobile phones and the Internet.

The cell phone 200 may comprise a baseband unit 230 for digital processing the information signal (voice, data, or image) in the frequency range before being modulated onto a carrier or demodulated after reception by using a signaling technique in which the signal is transmitted in its digital form and not changed by modulation techniques. The baseband unit 230 may comprise a baseband processor 235 for use in a communications system, for example, wireless communications systems and, more particularly, toward baseband processing of communication channels. For example, the baseband processor 235 may be suitable in the United States for a wireless phone service offered in both the cellular (approx. 800 Mega Hertz (MHz)) and PCS (Personal Communications Services) (approx. 1900 MHz) frequency bands in a dual-band phone.

When digital speech represented by a series of bits, which are modulated and transmitted from a base station (not shown) to the cell phone 200, and vice versa, the cell phone 200 may demodulate the received waveform to recover the bits as originally transmitted, and the recovered bits are then converted back into speech. The baseband unit 230 may enable data services, such as E-mail, Internet access, etc., that require digital communications.

In operation, the baseband unit 230 may use one or more types of digital communications systems. For example, FDMA (Frequency-Division-Multiple-Access) systems divide the radio spectrum into a plurality of radio channels corresponding to different carrier frequencies. TDMA (Time-Division-Multiple-Access) systems further divide the carrier frequencies into time slots. D-AMPS (Digital Advanced Mobile Phone System), PDC (Pacific Digital Cellular), and GSM (Global System for Mobile communications) are examples of digital TDMA cellular systems. Alternatively, if the radio channel is wide enough, multiple users can use the same channel using spread spectrum techniques and CDMA (Code-Division-Multiple-Access). IS-95 and J-STD-008 are examples of wireless systems incorporating CDMA standards.

The baseband unit 230 may comprise a RF interface 240 to interface with the RF unit 225. The baseband unit 230 may further comprise a controller 245 and a system connector 250. While the system connector 250 may be used to connect any external accessories and/or a battery charger unit (not shown), the controller 245 may comprise a storage device 252 to store a conventional CODEC module 254 and a phone manager (PM) module 256. The CODEC module 254 and the phone manger module 256 may be software and/or firmware that comprise instructions or program code. The CODEC module 254 may control voice functionality of the cell phone 200. The phone manger module 256 may control the device battery 130b, the charger circuitry 135, the speaker (SPK) 110b, and the microphone (Mic) 112b. The phone manger module 256 may control a subscriber identity module (SIM) 260, a smart-card securely storing the key identifying a mobile subscriber. For example, the SIM 260 may be used with a GSM system or with a compatible module it may be used for a UMTS phone and/or an Integrated Digital Enhanced Network (IDEN) phone. The SIM 260 may store text messages and a phone book. The baseband unit 230 may further comprise a liquid crystal display (LCD) 265, FLASH memory 270, static random access memory (SRAM) 275, a keypad 280, a vibrator 285, and a backlight 290.

Figure 3:
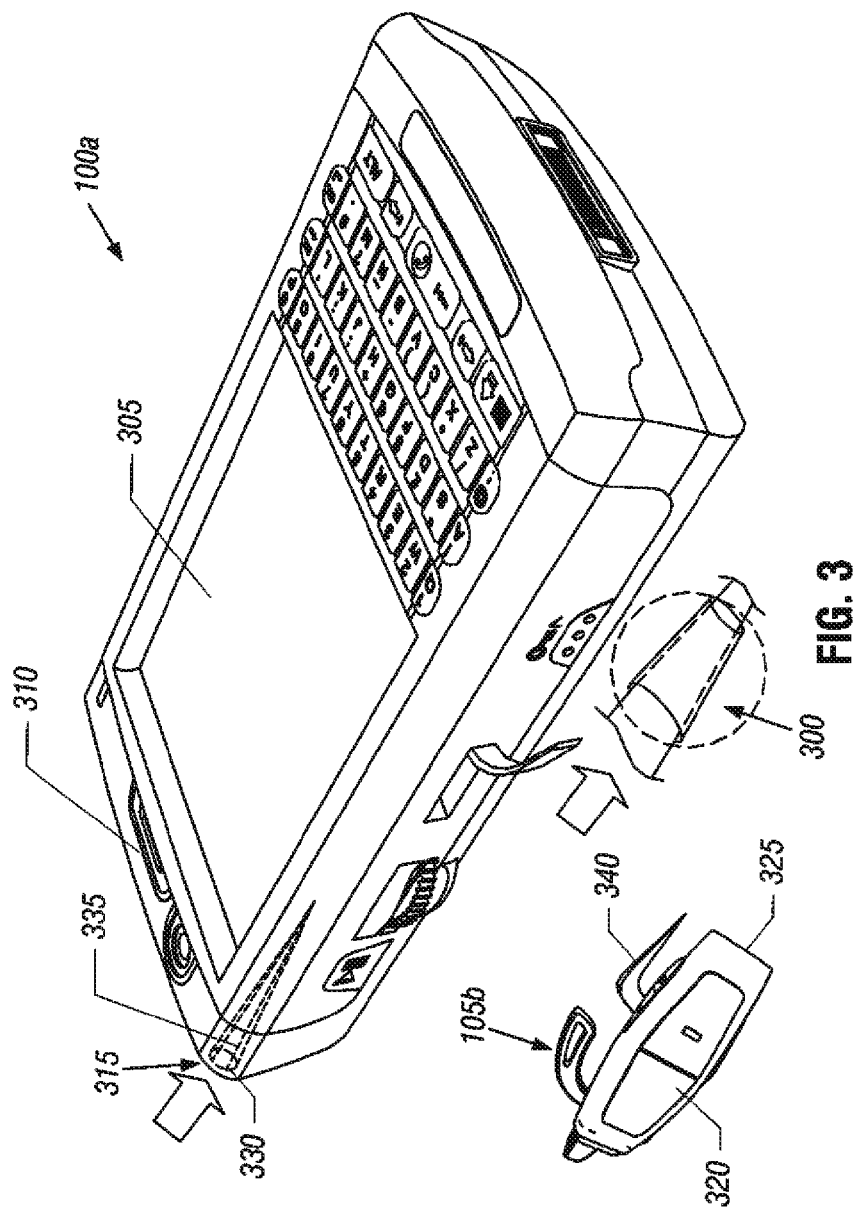
FIG. 3 illustrates a perspective view of a hand-held, portable electronic device including a retainer assembly having a cavity that forms an audiophone-retaining structure for the retainer assembly to provide a first portion in the surface of the device housing for securely holding a second portion of the attachable wireless audiophone at the hand-held, portable electronic device consistent with one embodiment of the present invention.

Turning now to FIG. 3, a hand-held, portable electronic device 100a is shown in a perspective view to include a retainer assembly 300 according to one illustrative embodiment of the present invention. The retainer assembly 300 may removably retain an attachable wireless audiophone 105b capable of coupling for communicating to the hand-held, portable electronic device 100a. The hand-held, portable electronic device 100a may comprise a device body 305 and a device housing 310 with a surface 315. By using the surface 315 of the device housing 310 and/or the device body 305, the retainer assembly 300 may removably receive the attachable wireless audiophone 105b for holding together as a pair with the hand-held, portable electronic device 100a. The attachable wireless audiophone 105b may include a headphone 320 and a microphone 325. The retainer assembly 300 having a cavity 315 that forms an audiophone-retaining structure for the retainer assembly 330 may provide a first portion 335 in the surface 315 of the device housing 310 for securely holding a second portion 340 of the attachable wireless audiophone 105b at the hand-held, portable electronic device 100a consistent with one embodiment of the present invention.

Examples of the first portion 335 include a tapered hollow structure, such as used for holding a stylus. Examples of the second portion 340 include a tapered solid structure, such as used for a stylus. For example, the shape of the tapered hollow structure and the tapered solid structure may be formed as a mating pair of two objects that may snuggly hold with each other due to a frictional force. In this way, the retainer assembly 300 may provide a locking or rigid latching structure. While the first portion 335 may be formed form a same material with which body of the hand-held, portable electronic device 100a is formed, the second portion 340 may be formed form a same material with which body of the attachable wireless audiophone 105b is formed. However, other desired forms and suitable material may be deployed to provide the first portion 335 and the second portion 340 depending upon a particular application having the benefit of the instant disclosure.

Persons of ordinary skill in the pertinent art would appreciate that for forming the retainer assembly 300 one or a combination of several material(s) may be used such as those used to fabricate the device housing 310 and/or the device body 305 of the hand-held, portable electronic device 100a. However, it is to be understood that a host of shapes and sizes may be obtained for the retainer assembly 300 based on a particular, functionality, dimensions of the shape and/or size of the hand-held, portable electronic device 100a and in accordance with dimensions of the shape and size of the attachable wireless audiophone 105b. Examples of the material that may be used to form the retainer assembly 300 include plastic, rubber, metal, and alloys. For example, polycarbonate, aluminum, aluminum alloy, magnesium may be employed for providing a lightweight and slim or ultra slim design with a compact structure to the retainer assembly 300. One example of the hand-held, portable electronic device 100a is a cellular or mobile phone that includes at least one of a digital music player, a personal digital assistant, a global positioning satellite receiver, a video player, and a pocket personal computer.

Figure 4:
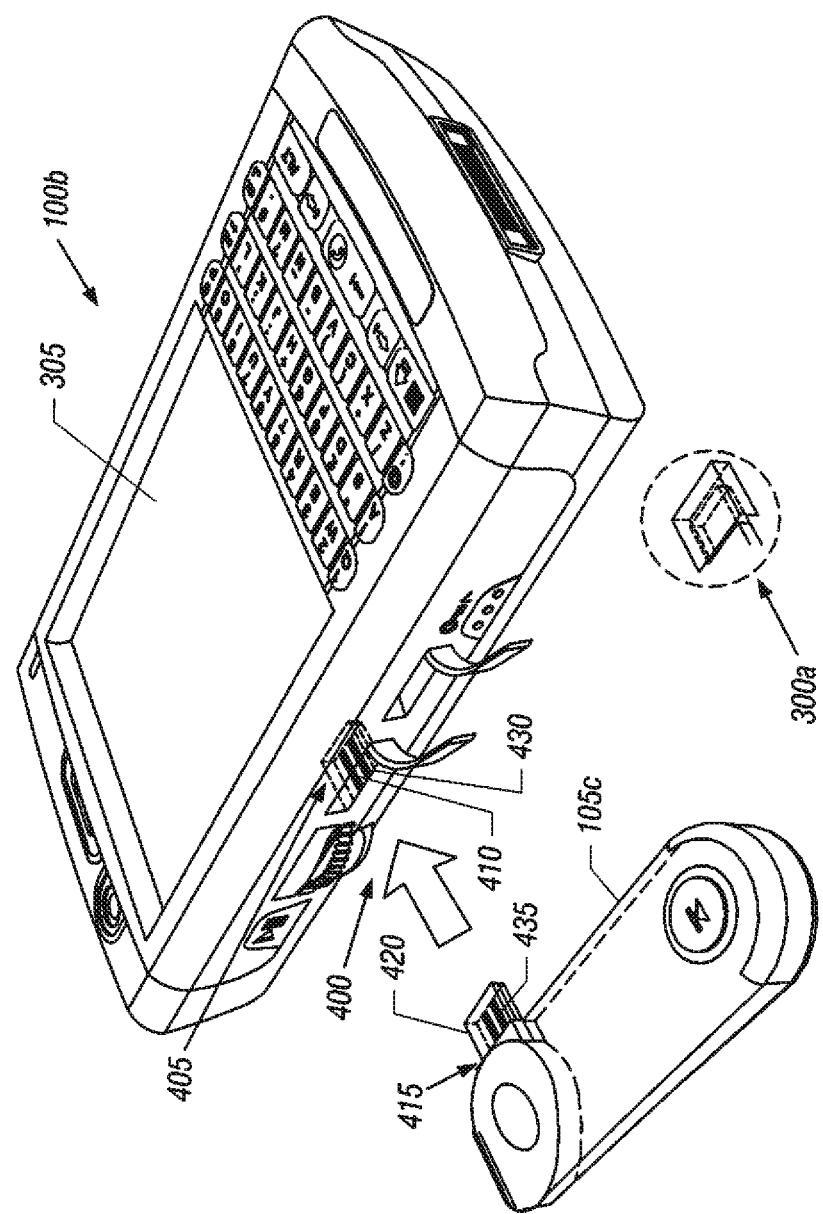
FIG. 4 illustrates a perspective view of a hand-held, portable electronic device including a retainer port having a socket that forms an audiophone-retaining structure for a retainer assembly to provide a first portion in the surface of the device housing for securely holding a second portion of the attachable wireless audiophone at the hand-held, portable electronic device consistent with one embodiment of the present invention.

Referring to FIG. 4, a hand-held, portable electronic device 100b is shown in a perspective view to include a retainer assembly 300a according to one illustrative embodiment of the present invention. In this perspective view, the hand-held, portable electronic device 100b includes a retainer port 400 having a socket 405 that forms an audiophone-retaining structure for the retainer assembly 300a. Consistent with one embodiment of the present invention, the retainer assembly 300a may provide a first portion 410 in the device housing 310 for securely holding a second portion 415 of an attachable wireless audiophone 105c at the hand-held, portable electronic device 100b. The retainer port 400 may be formed in the device housing 310 having a surface to receive a connector 420 of the attachable wireless audiophone 105c for securely holding the attachable wireless audiophone 105c at the hand-held, portable electronic device 100b.

In one embodiment, the socket 405 may receive the connector 420 of the attachable wireless audiophone 105c for in situ charging thereof at the hand-held, portable electronic device 100b. To provide in situ charging, in one embodiment, the retainer port 400 may use a power pin socket 430 to receive a power pin 435 of the connector 420 of the attachable wireless audiophone 105c. For in situ charging of the attachable wireless audiophone 105c at the hand-held, portable electronic device 100b, as one example, the attachable wireless audiophone 105c may comprise a Universal Serial Bus (USB) male connector that enables the attachable wireless audiophone 105c to receive charge at the power pin socket 430 of the hand-held, portable electronic device 100b. The attachable wireless audiophone 105c may comprise at least one of two headphones that may be folded into a single headset when the attachable wireless audiophone 105c is connected for in situ charging thereof at the hand-held, portable electronic device 100b. One example of the hand-held, portable electronic device 100b is a cellular or mobile phone that includes at least one of a digital music player, a personal digital assistant, a global positioning satellite receiver, a video player, and a pocket personal computer.

Figure 5:
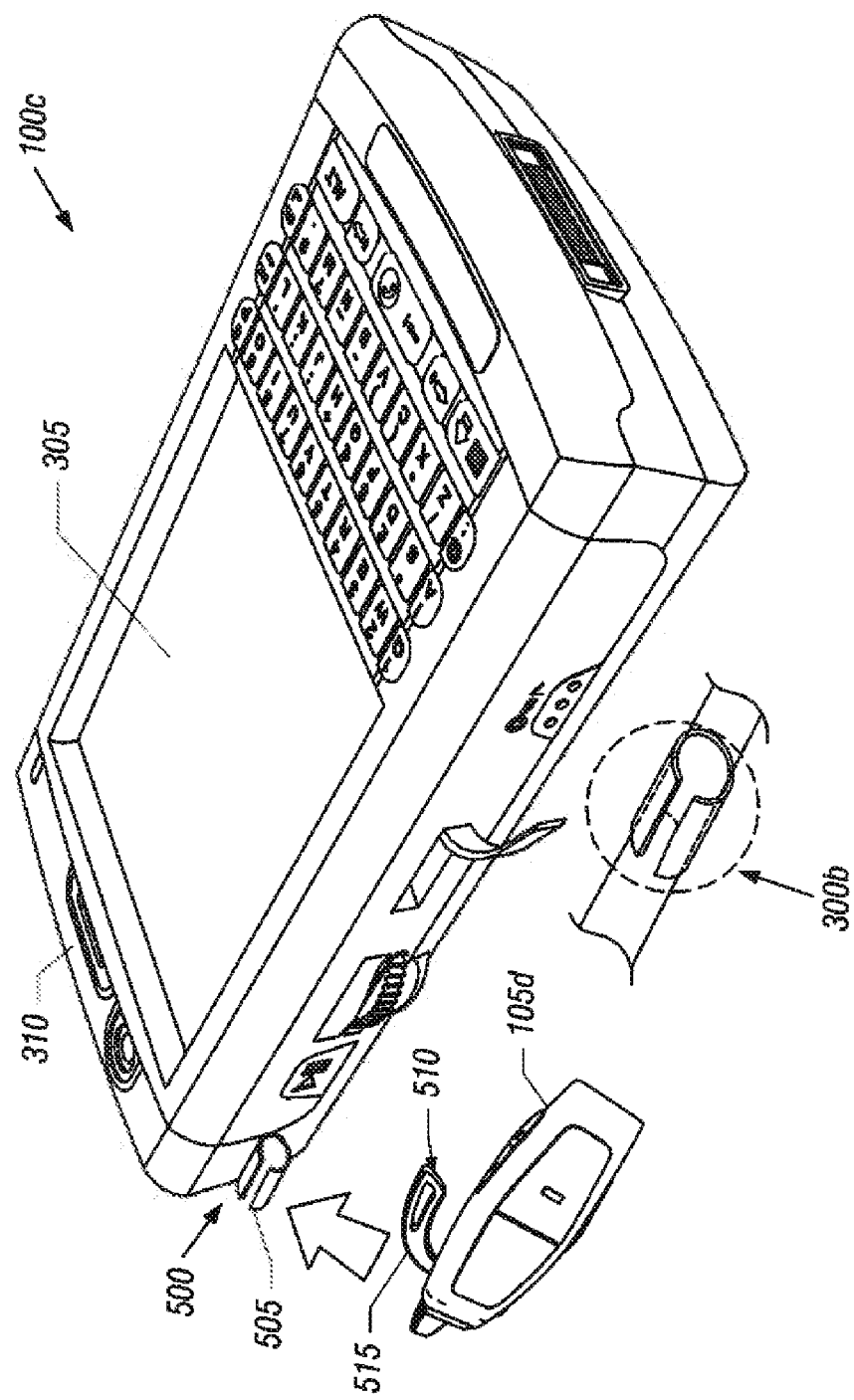
FIG. 5 illustrates a perspective view of a hand-held, portable electronic device including a retainer assembly having a latch to detachably retain the attachable wireless audiophone over the surface of the device housing consistent with one embodiment of the present invention consistent with one embodiment of the present invention.

Referring to FIG. 5, a hand-held, portable electronic device 100c is shown in a perspective view to include a retainer assembly 300b according to one illustrative embodiment of the present invention. The retainer assembly 300b may comprise a latch 500 to detachably retain an attachable wireless audiophone 105d over the surface of the device housing 310 consistent with one embodiment of the present invention. A first portion 505 of the surface of the device housing 310 may include the latch 500 formed to detachably retain at least a second portion 510 of the attachable wireless audiophone 105d with the hand-held, portable electronic device 100c.

According to one embodiment on the present invention, the latch 500 may be mounted on the device housing 310, for example, on a narrow flat side of the device body 305 of the hand-held, portable electronic device 100c. The latch 500 may be adapted to hold a flexible ear cord 515. In this way, the latch 500 may removably retain the attachable wireless audiophone 105d capable of coupling for communicating with the hand-held, portable electronic device 100c as a pair together for storage and reuse. For example, by using the surface of the device housing 310 and/or the device body 305 of the hand-held, portable electronic device 100c, the retainer assembly 300b may removably store the attachable wireless audiophone 105d along with an audio and/or video player capable of storing and playing MP3 music files and/or MPEG video files. Accordingly, the retainer assembly 300b may externally store the headphones 230 over the surface of the device housing 310 and/or internally on the device body 305 of the hand-held, portable electronic device 100c. One example of the hand-held, portable electronic device 100c is a cellular or mobile phone that includes at least one of a digital music player, a personal digital assistant, a global positioning satellite receiver, a video player, and a pocket personal computer.

Figure 6:
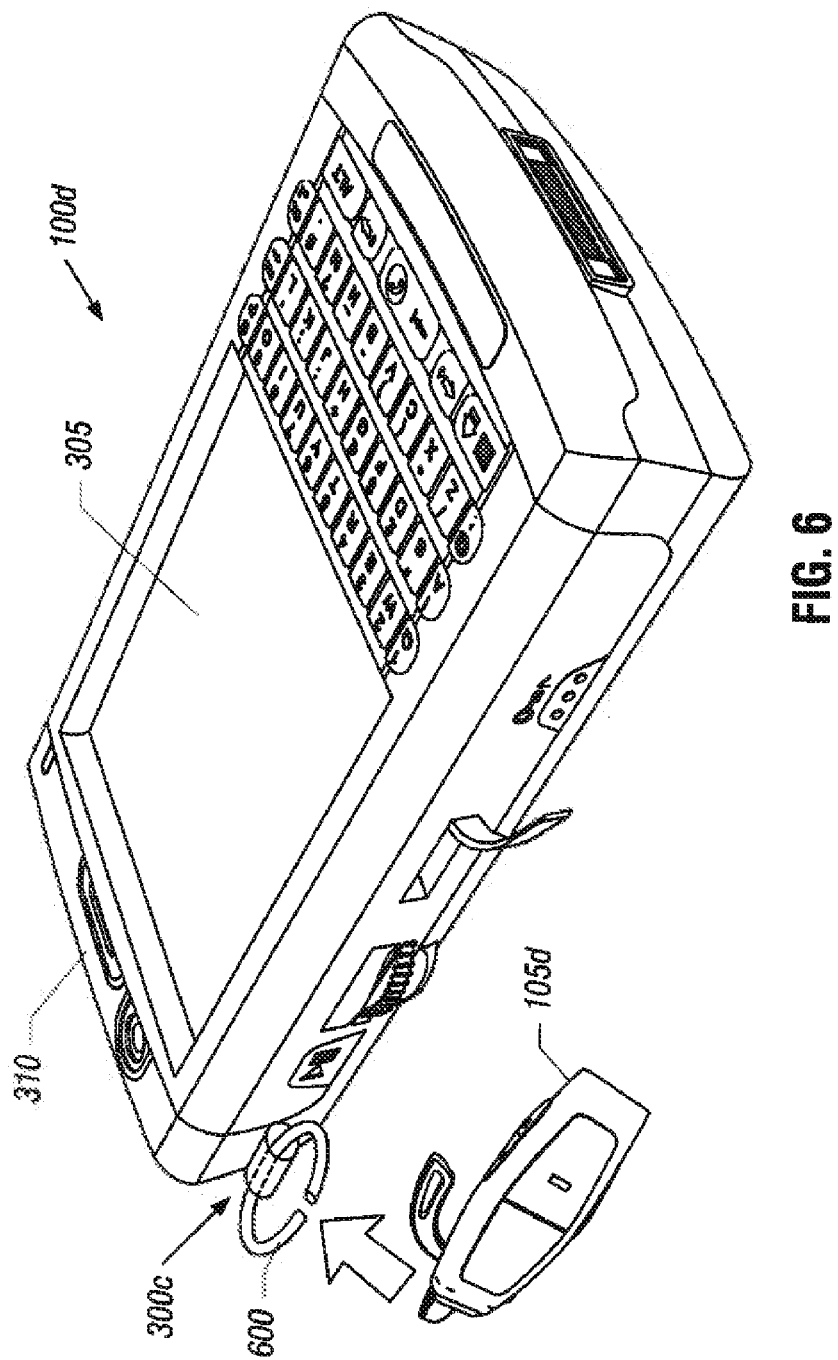
FIG. 6 illustrates a perspective view of a hand-held, portable electronic device including a retainer assembly including a flexible hook pivotably coupled to the hand-held, portable electronic device for disposing the attachable wireless audiophone over the surface of the device housing consistent with one embodiment of the present invention.

Referring to FIG. 6, a hand-held, portable electronic device 100d is shown in a perspective view to include a retainer assembly 300c according to one illustrative embodiment of the present invention. The retainer assembly 300c may include a flexible hook 600 pivotably coupled to the hand-held, portable electronic device 100d for disposing the attachable wireless audiophone 105d over the surface of the device housing 310 consistent with one embodiment of the present invention. Accordingly, when the attachable wireless audiophone 105d is being not worn by a user of the hand-held, portable electronic device 100d, the retainer assembly 300c may externally hold the attachable wireless audiophone 105d over the hand-held, portable electronic device 100d. One example of the hand-held, portable electronic device 100d is a cellular or mobile phone that includes at least one of a digital music player, a personal digital assistant, a global positioning satellite receiver, a video player, and a pocket personal computer.

Figure 7:
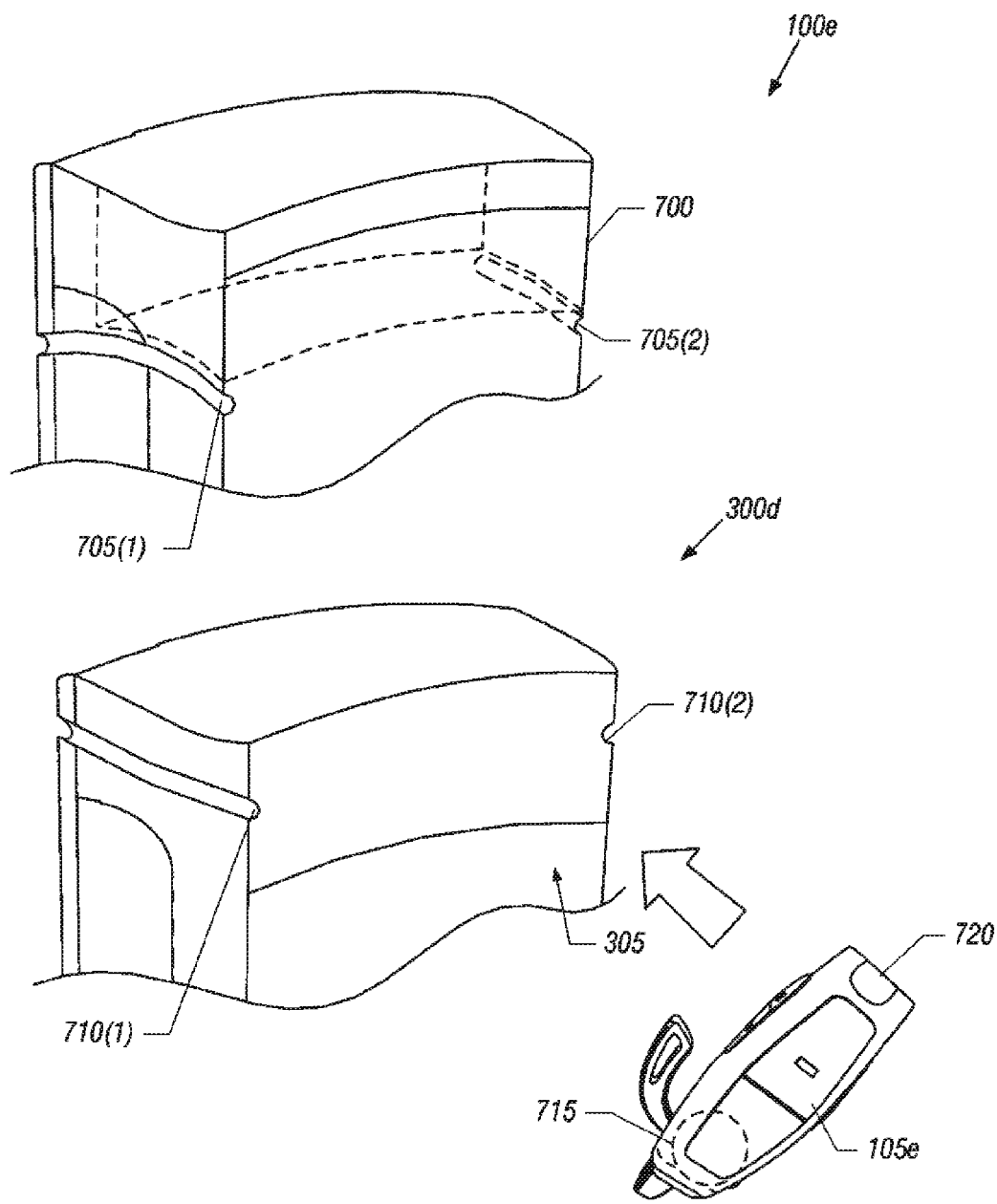
FIG. 7 illustrates a perspective view of a hand-held, portable electronic device including a retainer assembly including a box having one or more threaded notches for removably mounting on the hand-held, portable electronic device to store the attachable wireless audiophone, as shown in FIG. 1, consistent with one embodiment of the present invention.

Referring to FIG. 7, a hand-held, portable electronic device 100e is shown in a perspective view to include a retainer assembly 300d according to one illustrative embodiment of the present invention. Consistent with one embodiment of the present invention, the retainer assembly 300d may include a box 700 having one or more threaded notches 705(1,2) to fit in mating notches 710(1,2) for removably mounting on the hand-held, portable electronic device 105e to store an attachable wireless audiophone 105e. Accordingly, the retainer assembly 300d may externally hold the attachable wireless audiophone 105e over the device body 305 of the hand-held, portable electronic device 100e. In one embodiment, the retainer assembly 300d may be an attachable sleeve configured to latchably mount on the hand-held, portable electronic device 100e.

The box 700 may be operable for mounting on or as the device housing 310 to store the attachable wireless audiophone 105e housed therein with the hand-held, portable electronic device 100e when the attachable wireless audiophone 105e is being not worn by a user of the hand-held, portable electronic device 100e. The attachable wireless audiophone 105e may be a handsfree headset that comprises at least one flexible earphone 715 and a microphone 720. One example of the hand-held, portable electronic device 100e is a cellular or mobile phone that includes at least one of a digital music player, a personal digital assistant, a global positioning satellite receiver, a video player, and a pocket personal computer.

Figure 8:
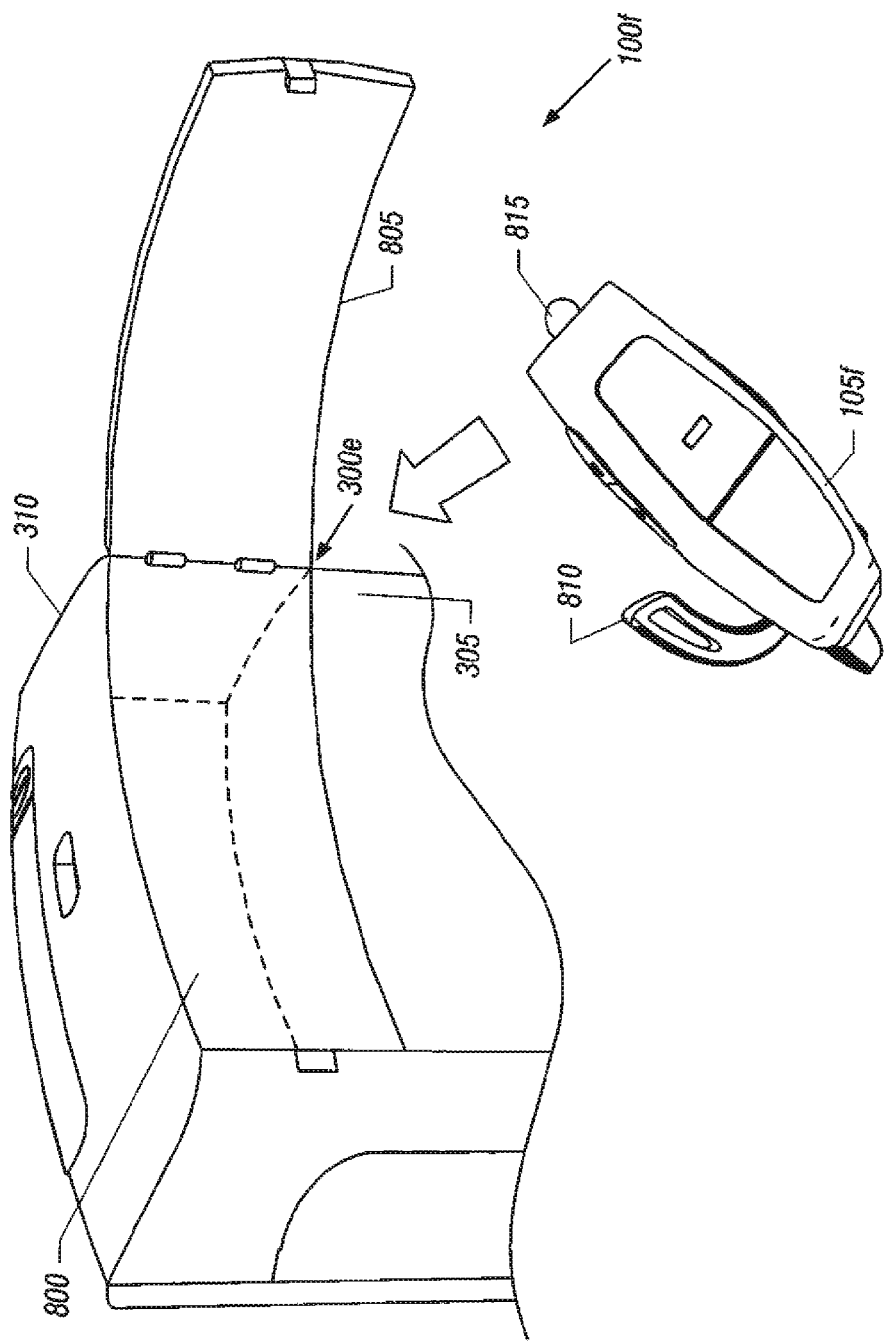
FIG. 8 illustrates a perspective view of a hand-held, portable electronic device including a retainer assembly including a receptacle having a lid coupled to hand-held, portable electronic device for pivotably closing the receptacle to store the attachable wireless audiophone, as shown in FIG. 1, consistent with one embodiment of the present invention.

Referring to FIG. 8, a hand-held, portable electronic device 100f is shown in a perspective view to include a retainer assembly 300e according to one illustrative embodiment of the present invention. The retainer assembly 300e may include a receptacle 800 having a lid 805 coupled to hand-held, portable electronic device 100f for pivotably closing the receptacle 800 to store an attachable wireless audiophone 105*f* consistent with one embodiment of the present invention. The receptacle 800 may be operable for keeping in the attachable wireless audiophone 105*f* for storage by housing it therein with the device body 305 of the hand-held, portable electronic device 100*f*. That is, the receptacle 800 may hold the attachable wireless audiophone 105*f* when it is not being worn by a user of the hand-held, portable electronic device 100*f*.

The attachable wireless audiophone 105*f* may be a hands-free headset that comprises a bendable earphone 810 and a flexible microphone 815. One example of the hand-held, portable electronic device 100*f* is a cellular or mobile phone that includes at least one of a digital music player, a personal digital assistant, a global positioning satellite receiver, a video player, and a pocket personal computer.

Figure 9:
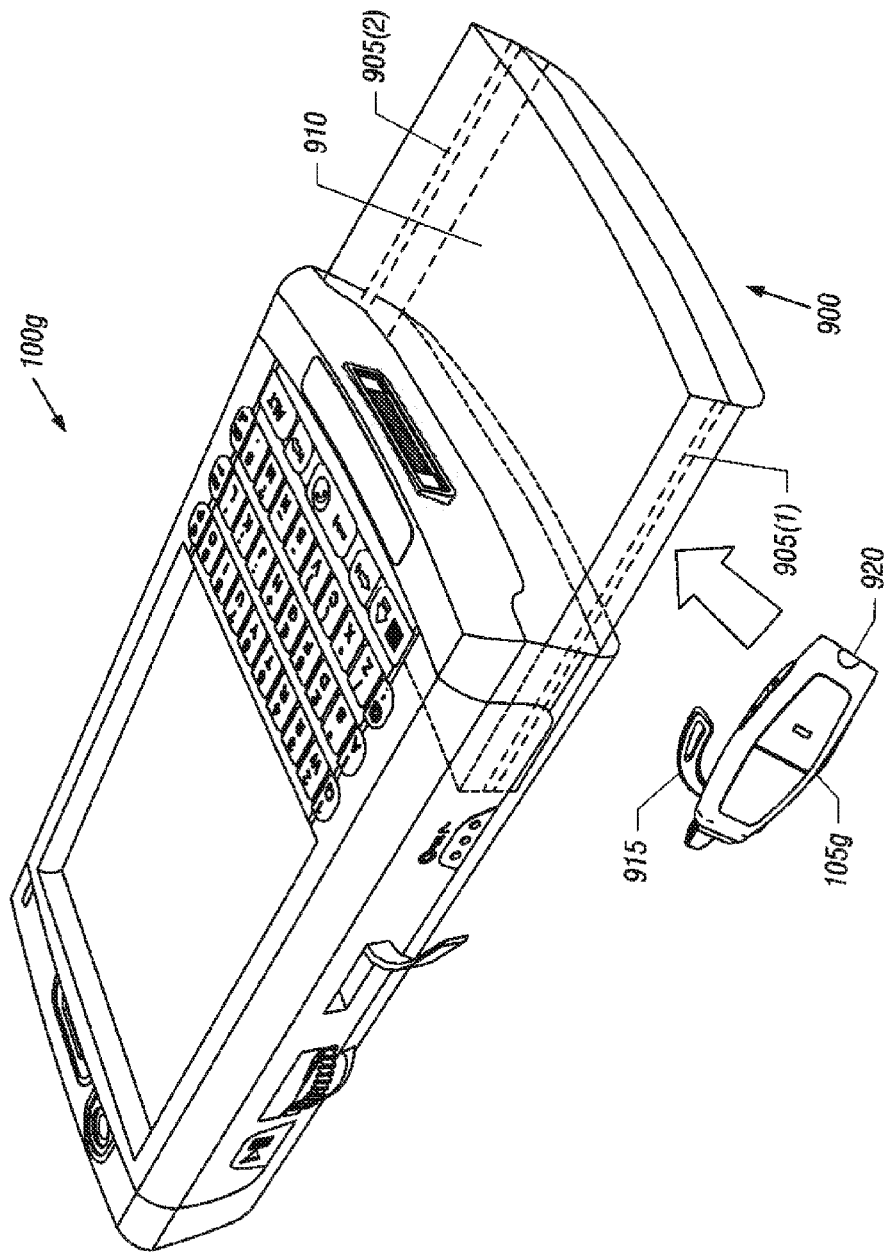
FIG. 9 illustrates a perspective view of a hand-held, portable electronic device including a retainer assembly including a retractable holder having one or more rails operable for mounting in the device housing and having a cup on a distil end to retain the attachable wireless audiophone, as shown in FIG. 1, consistent with one embodiment of the present invention.

Referring to FIG. 9, a hand-held, portable electronic device 100*g* is shown in a perspective view to include a retainer assembly 300*f* according to one illustrative embodiment of the present invention. The retainer assembly 300*f* may include a retractable holder 900 having one or more rails 905(1,2) operable for mounting in the device housing 310. The retractable holder 900 having a cup 910 on a distil end may retain an attachable wireless audiophone 105*g* consistent with one embodiment of the present invention.

The attachable wireless audiophone 105*g* may be a hands-free headset that comprises at least one pivotally movable ear grip 915 and a flexible microphone 920. One example of the hand-held, portable electronic device 100*g* is a cellular or mobile phone that includes at least one of a digital music player, a personal digital assistant, a global positioning satellite receiver, a video player, and a pocket personal computer. The attachable wireless audiophone 105*g* may be a handsfree headset that comprises at least one insertable ear plug. The attachable wireless audiophone 105*g* may be a handsfree headset that comprises at least one arm that latches externally to ear.

Figure 10:
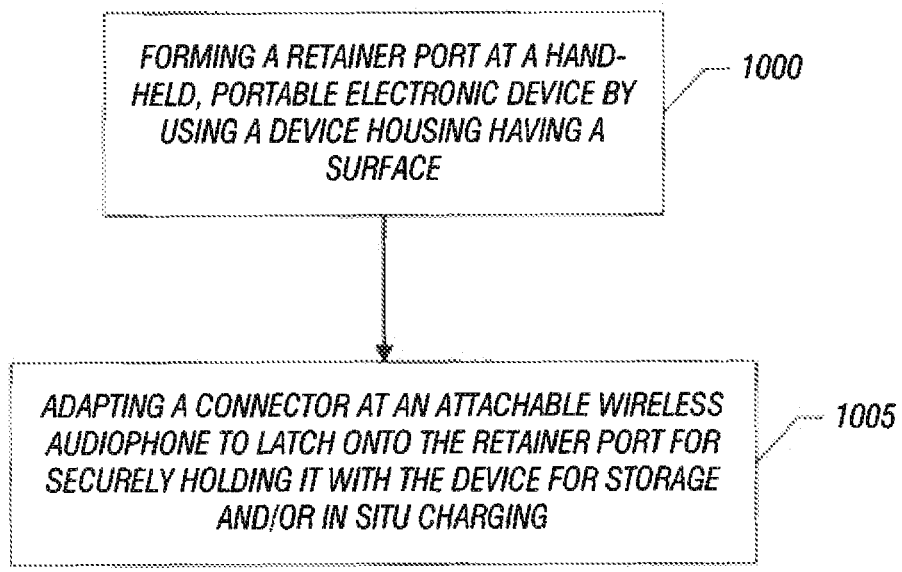
FIG. 10 illustrates a stylized representation for implementing a method for providing a retainer port to retain an attachable wireless audiophone including at least one speaker and a microphone on a hand-held, portable electronic device shown in FIG. 3 consistent with one illustrative embodiment of the present invention.

Turning now to FIG. 10, a stylized representation for implementing a method for providing the retainer port 400, as shown in FIG. 4, is illustrated to retain the attachable wireless audiophone 105*c* including at least one speaker and a microphone on the hand-held, portable electronic device 100*b* shown in FIG. 4 consistent with one illustrative embodiment of the present invention.

At block 1000, by using the device housing 310 having a surface of the hand-held, portable electronic device 100*b* the retainer port 400 may be formed. That is, at the hand-held, portable electronic device 100*b*, the retainer port 400 may be configured for receiving the attachable wireless audiophone 105*c*. At block 1005, the connector 415 at the attachable wireless audiophone 105*c* may be adapted to latch on to the retainer port 400 that may receive the connector 415 of the attachable wireless audiophone 105*c* for securely holding it at the hand-held, portable electronic device 100*b*. In this way, by using the retainer assembly 300*a*, the hand-held, portable electronic device 100*b* may removably receive the attachable wireless audiophone 105*c* for retaining it over the device body 310. According to various embodiments of the retainer assembly 300*a* including the shown structures 300*a*-300*e* may be formed, molded, manufactured, assembled or fabricated, as illustrated in FIGS. 3 to 8. For example, the retainer assembly 300*a*-300*e* structures may be obtained by using one or more material(s) in a combination as described above based on a specific application having desired dimensions.

Figure 11:
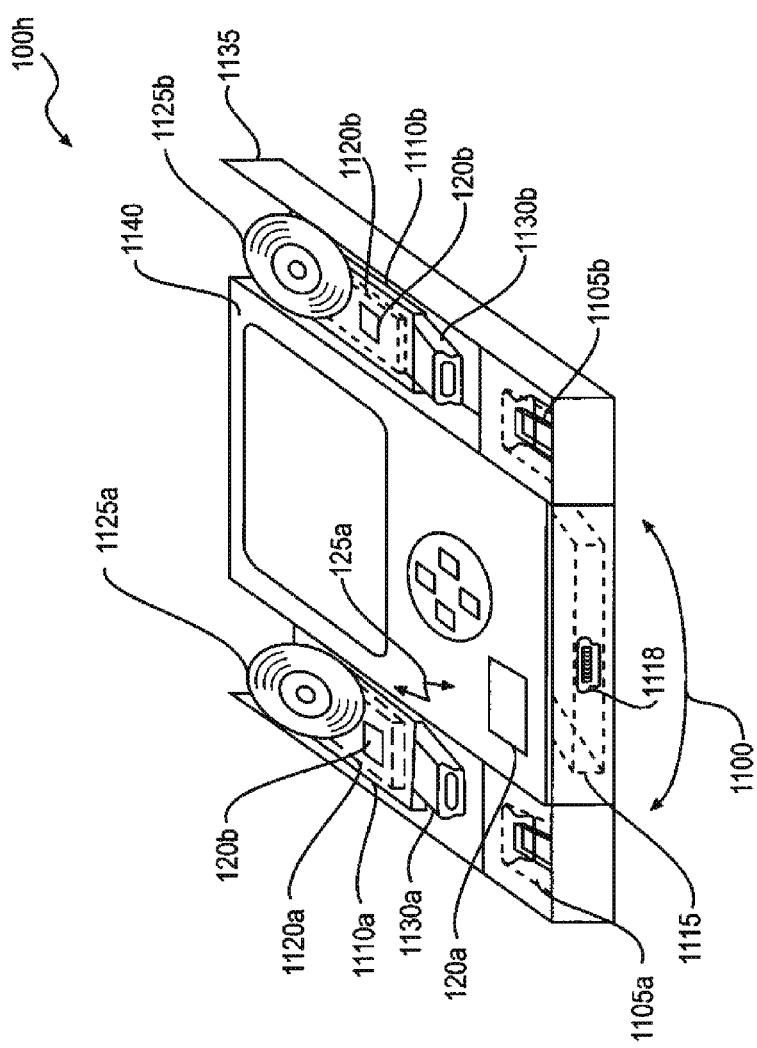
FIG. 11 illustrates a perspective view of a hand-held, portable electronic device including a retainer port including at least one of a first or a second port socket configured for removably retaining a first attachable wireless audiophone for in situ charging thereof when the hand-held, portable electronic device is connected to an electrical power source for recharging, consistent with one embodiment of the present invention.

Referring to FIG. 11, it illustrates a perspective view of a hand-held, portable electronic device 100*h* including a retainer port 1100 including at least one of a first 1105*a* or a second port socket 1105*b* configured for removably retaining a first attachable wireless audiophone 1110*a* for in situ charging thereof when the hand-held, portable electronic device 100*h* is connected to an electrical power source (not shown) for recharging, consistent with one embodiment of the present invention. The second port socket 1105*b* may be configured for removably retaining a second attachable wireless audiophone 1110*b* on the hand-held, portable electronic device 100*h*.

Consistent with one embodiment of the present invention, the hand-held, portable electronic device 100*h* may include the first transceiver 120*a* adapted to communicate with the first attachable wireless audiophone 1110*a* over a short-range wireless communication link 125*a*. The first attachable wireless audiophone 1110*a* may include the second transceiver 120*b* adapted to communicate with the hand-held, portable electronic device 100*h* using the short-range wireless communication link 125*a*. The second transceiver 120*b* of the attachable wireless audiophone 1110*a* is adapted to communicate with the first transceiver 120*a* of the hand-held, portable electronic device 100*h* using a Bluetooth protocol for a short-range wireless communication associated with a wireless user. The hand-held, portable electronic device 100*h* may comprise the charger circuitry 135 coupled to the at least one of the first 1105*a* or the second port socket 1105*b* for in situ charging of the first attachable wireless audiophone 1110*a* when the hand-held, portable electronic device 100*h* is connected to an electrical power source for recharging.

In operation, the first attachable wireless audiophone 1110*a* to receive in situ charge when a device battery 1115 for the hand-held, portable electronic device 100*h* to receive charge from the electrical power source at a power port 1118 using an AC power supply adapter (not shown) that provides a desired DC voltage output. The first attachable wireless audiophone 1110*a* may include a first battery 1120*a* that receives charge from the electrical power source using the AC power supply adapter that enables a first desired DC voltage for recharging the first battery 1120*a*. The first attachable wireless audiophone 1110*a* may include a first headset 1125*a* configured for consumer wearing by a wireless user, for example, inside an ear.

The retainer port 1100 may be configured to mate with a first connector 1130*a* of the first attachable wireless audiophone 1110*a* including at least one of a speaker or a microphone (not shown) at the hand-held, portable electronic device 100*h* having a device housing 1135 with a surface 1140. The second port socket 1105*b* to communicatively receive a second connector 1130*b* of the second attachable wireless audiophone 1110*b* for in situ charging thereof when the hand-held, portable electronic device 100*h* is connected to the electrical power source for recharging.

In one embodiment, the retainer port 1100 may be a power pin socket to receive a power pin of the first connector 1130*a* of the first attachable wireless audiophone 1110*a* for in situ charging thereof at the hand-held, portable electronic device 100*h*. The first attachable wireless audiophone 1110*a* may comprise a Universal Serial Bus (USB) male connector that enables the first attachable wireless audiophone 1110*a* to receive charge at the power pin socket of the hand-held, portable electronic device 100*h*.

The second attachable wireless audiophone 1110*b* to receive in situ charge when the device battery 1115 for the hand-held, portable electronic device 100*h* to receive charge from the electrical power source using an AC power supply adapter that provides a desired DC voltage output. The second attachable wireless audiophone 1110*b* may include a second battery 1120*b* that receives charge from the electrical power source using the AC power supply adapter that enables a second desired DC voltage for recharging the second battery 1120b. The second attachable wireless audiophone 1110b includes a second headset 1125b configured for consumer wearing by a wireless user, for example, inside an ear. The second transceiver 120b of the second attachable wireless audiophone 1110b is adapted to communicate with the first transceiver 120b of the hand-held, portable electronic device 100h using a Bluetooth protocol for a short-range wireless communication associated with the wireless user.

Figure 12:
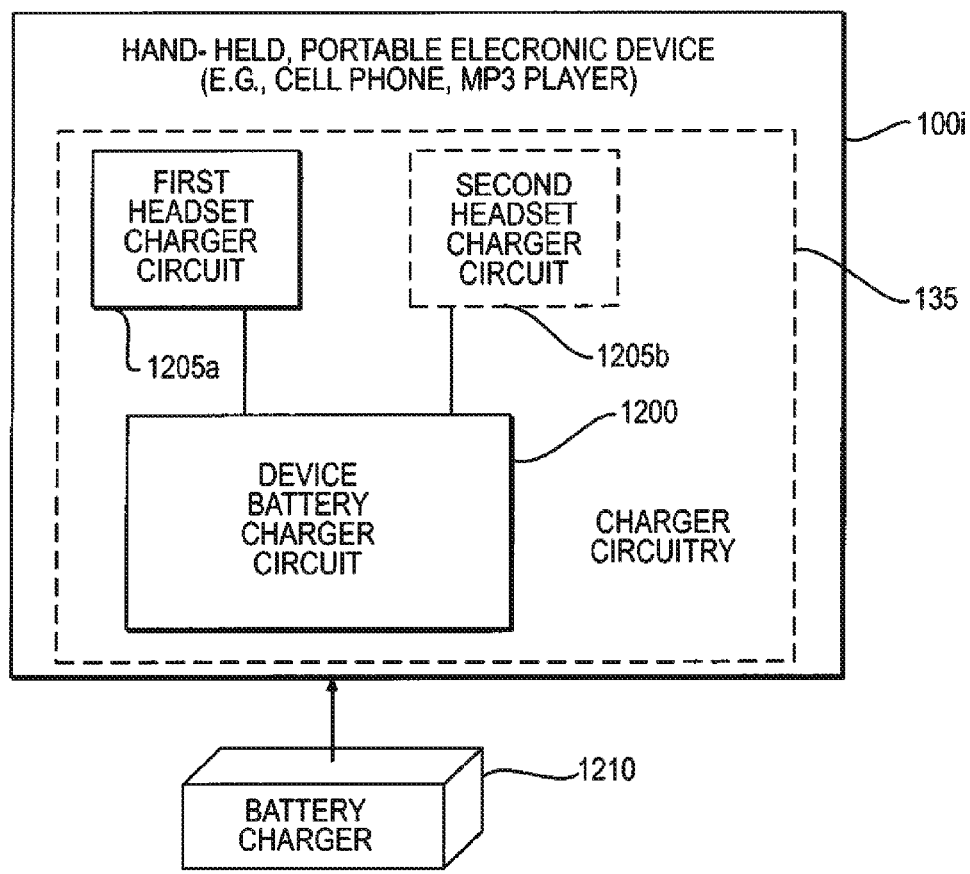
FIG. 12 schematically illustrates a hand-held, portable electronic device with the charger circuitry shown in FIG. 1 including a device battery charger circuit, a first headset charger circuit, and optionally a second headset charger circuit in accordance with one embodiment of the present invention.

Referring to FIG. 12, it schematically illustrates a hand-held, portable electronic device 100i with the charger circuitry 135 shown in FIG. 1 including a device battery charger circuit 1200, a first headset charger circuit 1205a, and optionally a second headset charger circuit 1205b in accordance with one embodiment of the present invention. Examples of the hand-held, portable electronic device 100i include a cell phone, a digital music layer such as a MP3 player. Additional examples include a cell phone that includes at least one of a digital music player, a personal digital assistant, a global positioning satellite receiver, a video player, and a pocket personal computer. Further examples of the hand-held, portable electronic device 100i include at least one of a digital music player, a personal digital assistant, a global positioning satellite receiver, a video player, and a pocket personal computer such as a mobile Internet device.

As shown in FIG. 12, a conventional battery charger 1210 may provide charge from an electrical power source using an AC power supply adapter that provides a desired DC voltage output.

Figure 13:
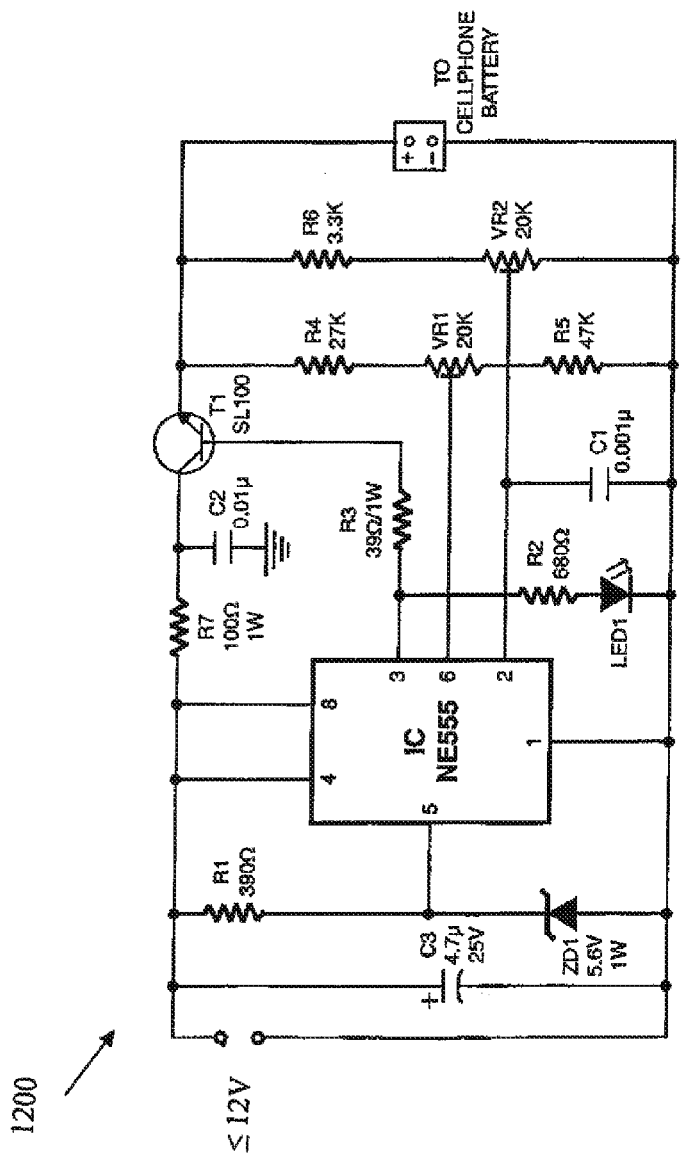
FIG. 13 schematically illustrates the device battery charger circuit shown in FIG. 12 that replenishes a battery of a cell phone according to one embodiment of the present invention.

Referring to FIG. 13, it schematically illustrates details of the device battery charger circuit 1200 shown in FIG. 12 that replenishes the device battery 1115 of the hand-held, portable electronic device 100i such as a cell phone according to one embodiment of the present invention. In one embodiment of the present invention, the device battery charger circuit 1200 may be a current-limited voltage source. The device battery charger circuit 1200 may provide to a cell phone battery packs in the battery 3.6-6V DC and 180-200 mA current for charging. The device battery 1115 may comprise one to three Nickel Cadmium (NiCd) cells, each having 1.2V rating. A 12V input with current (1.8 A) may charge the battery connected across the output terminals. The device battery charger circuit 1200 may monitor the voltage level of the device battery 1115. The device battery charger circuit 1200 may automatically cut off the charging process when its output terminal voltage increases above the predetermined voltage level.

The device battery charger circuit 1200 may comprise a Timer IC NE555 to charge and monitor the voltage level in the device battery 1115. Control voltage pin 5 of IC NE555 is provided with a reference voltage of 5.6V by zener diode ZD1. Threshold pin 6 is supplied with a voltage set by VR1 and trigger pin 2 is supplied with a voltage set by VR2.

When a discharged cell phone battery is connected to the device battery charger circuit 1200, the voltage given to trigger pin 2 of IC1 is below ⅓ Vcc and hence the flip-flop in the IC is switched on to take output pin 3 high. When the device battery 1115 is fully charged, the output terminal voltage increases the voltage at pin 2 of IC1 above the trigger point threshold. This switches off the flip-flop and the output goes low to terminate the charging process. Threshold pin 6 of IC1 is referenced at ⅔ Vcc set by VR1. Transistor T1 is used to enhance the charging current. Value of R3 is critical in providing the required current for charging. With the given value of 39-ohm the charging current is around 180 mA.

The device battery charger circuit 1200 may be constructed on a small general-purpose PCB. For calibration of cut-off voltage level, use a variable DC power source. Connect the output terminals of the circuit to the variable power supply set at 7V. Adjust VR1 in the middle position and slowly adjust VR2 until LED1 goes off, indicating low output. LED1 should turn on when the voltage of the variable power supply reduces below 5V. The device battery charger circuit 1200 may use suitable connector for connecting to the cell phone battery, such as the device battery 1115.

Consistent with one embodiment of the present invention, the device battery charger circuit 1200 may power a Motorola make cell phone battery rated at 3.6V, 320 mAH. In place of 5.6V zener, a 3.3V zener diode can be used in this instance. The device battery charger circuit 1200 may provide a charging current of about 200 mA.

Figure 14:
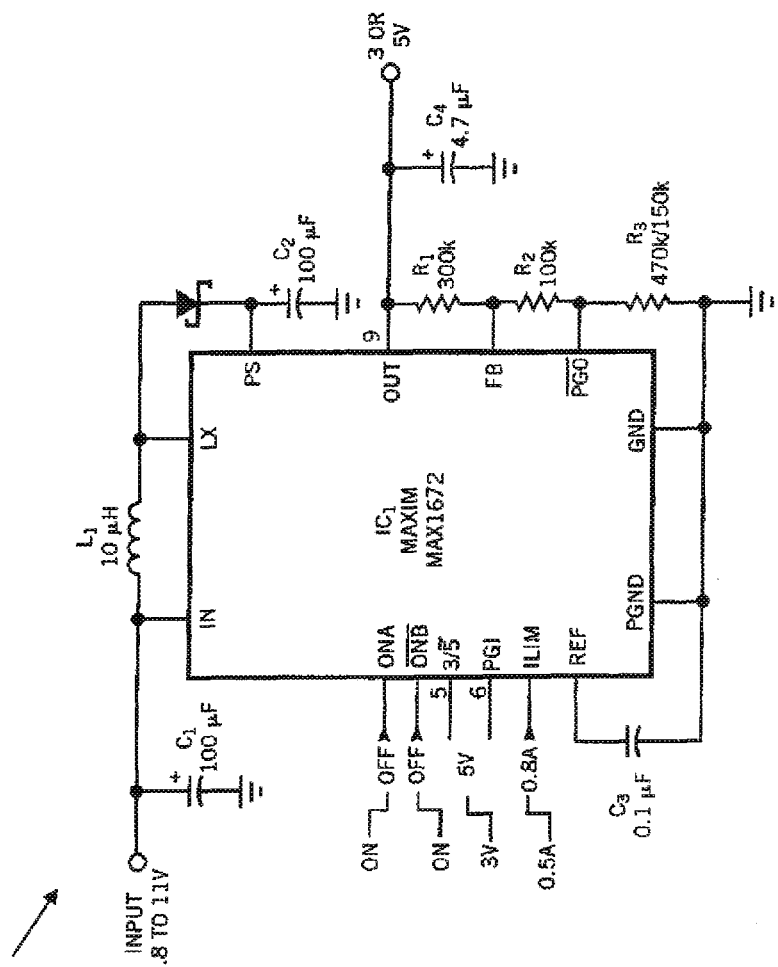
FIG. 14 schematically illustrates the first headset charger circuit shown in FIG. 12 that replenishes a battery of a first attachable wireless audiophone according to one embodiment of the present invention.
Figure 15:
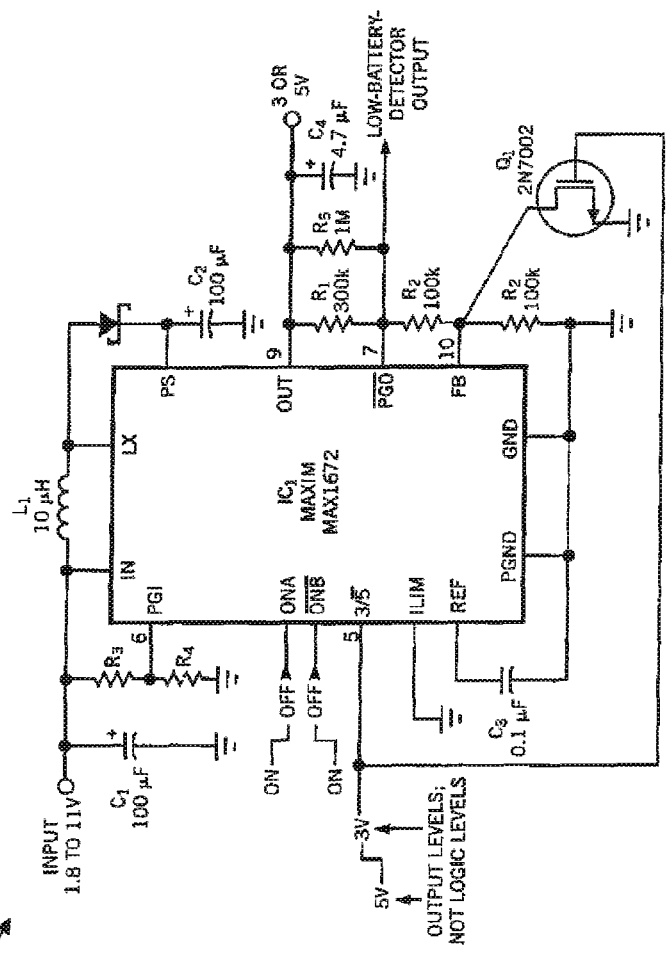
FIG. 15 schematically illustrates the first headset charger circuit shown in FIG. 12 that replenishes a battery of a first attachable wireless audiophone according to another embodiment of the present invention.

Referring to FIG. 14, it schematically illustrates the first headset charger circuit 1205a shown in FIG. 12 that replenishes the first battery 1120a of the first attachable wireless audiophone 1110a according to one embodiment of the present invention. Likewise, FIG. 15 schematically illustrates the first headset charger circuit 1205a shown in FIG. 12 that replenishes the first battery 1120a of the first attachable wireless audiophone 1110a according to another embodiment of the present invention.

The first headset charger circuit 1205a is schematically illustrated according to one embodiment of the present invention to power the first battery 1120a. The first headset charger circuit 1205a may charge the first battery 1120a to 3V operation or provide charge for 5V operation of a battery. As shown in FIG. 14, consistent with one embodiment of the present invention, Maxim IC MAX 1672 that combines a step-up DC/DC converter with a linear regulator for allowing it to regulate up or down for a range of input voltages may be used to realize the first headset charger circuit 1205a. The first headset charger circuit 1205a may offer hardware-selectable fixed outputs of 3.3 and 5V; however, 3.3V is out of spec for 3V first or second batteries. With suitably chosen R1/R2/R3 values, see for example, as shown in FIG. 14, one can switch the regulated output between 3V and 5V (or any other two outputs within the allowed range) by applying digital control to the power-good input (PGI). The powergood output (PGO), the output of an internal comparator, then changes the IC's feedback by grounding the node between R2 and R3. If the power-good comparator is in use, one can implement the digital control using the 3/5 input and an external MOSFET, as shown in the second headset charger circuit 1205b of FIG. 15.

Portions of the present invention and corresponding detailed description are presented in terms of physical and symbolic representations of components. These descriptions and representations are the ones by which those of ordinary skill in the art effectively convey the substance of their work to others of ordinary skill in the art. It should be borne in mind, however, that all of these and similar components are to be associated with the appropriate physical quantities and are merely convenient labels applied to these structures.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different by equivalent manners apparent to those skilled in the art having the benefit of the teachings herein, Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A hand-held, portable electronic device for use with a stereo pair of first and second attachable wireless headsets each including at least one of a speaker and a microphone, a battery and a metal connector, the hand-held, portable electronic device comprising:
 a device body;
 a device battery;
 a power port that is configured to electrically couple to the device battery to receive charge from an electrical power source;
 a charger circuitry configured to substantially simultaneously charge the device battery, said battery of the said first attachable wireless headset and said battery of said second attachable wireless headset;
 a device housing that encloses the device body, said device housing having an exterior surface; and
 a retainer port to removably retain said first and second attachable wireless headsets, said retainer port including:
  a first electrical socket that defines a first retaining structure formed in said exterior surface of said device housing, said first retaining structure is configured to receive said metal connector of said first attachable wireless headset for storing said first attachable wireless headset substantially external to said device body of said hand-held, portable electronic device by keeping said first attachable wireless headset substantially outside of said device housing, and
  a second electrical socket that defines a second retaining structure formed in said exterior surface of said device housing, said second retaining structure is configured to receive said metal connector of said second attachable wireless headset for storing said second attachable wireless headset substantially external to said device body of said hand-held, portable electronic device by keeping said second attachable wireless headset substantially outside of said device housing,
 wherein said hand-held, portable electronic device includes a first transceiver adapted to communicate with said first and second attachable wireless headsets over a wireless communication link, each of said first and second attachable wireless headsets including a second transceiver adapted to communicate with said hand-held, portable electronic device using said wireless communication link, wherein said first electrical socket including:
  a first cavity for retaining said first attachable wireless headset at said hand-held, portable electronic device by inserting said metal connector of said first attachable wireless headset within said first cavity, wherein said first retainer port to receive said metal connector of said first attachable wireless headset which provides charge only for in situ charging thereof at said hand-held, portable electronic device,
 wherein said first attachable wireless audiophone is stored for reuse when physically connected to said hand-held, portable electronic device, and wherein said second electrical socket including:
  a second cavity for retaining said second attachable wireless headset at said hand-held, portable electronic device by inserting said metal connector of said second attachable wireless headset within said second cavity, wherein said second retainer port to receive said metal connector of said second attachable wireless headset which provides charge only for in situ charging thereof at said hand-held, portable electronic device, wherein said second attachable wireless headset is stored for reuse when physically connected to said hand-held, portable electronic device,
 wherein each of said first and second electrical sockets is a power pin socket that is configured to receive a power pin of a respective one of said metal connectors of said first and second attachable wireless headsets for in situ charging thereof at said hand-held, portable electronic device, and
 wherein said respective one of said metal connectors of said first and second attachable wireless headsets comprise a Universal Serial Bus (USB) male connector that enables a respective one of said first and second attachable wireless headsets to receive charge at said power pin socket of said first and second attachable wireless headsets respectively of said hand-held, portable electronic device.

2. The hand-held, portable electronic device, as set forth in claim 1, wherein each of said first and second attachable wireless headsets is a handsfree headset that comprises at least one flexible earphone and said hand-held, portable electronic device is a cell phone that includes at least one of a digital music player, a personal digital assistant, a global positioning satellite receiver, a video player, and a pocket personal computer.

3. The hand-held, portable electronic device, as set forth in claim 1, wherein each of said first and second attachable wireless headsets is a headset configured for consumer wearing by a wireless user, each of said second transceivers of said first and second attachable wireless headsets respectively is adapted to communicate with said first transceiver of said hand-held, portable electronic device using a Bluetooth protocol for a short-range wireless communication associated with the wireless user, said hand-held, portable electronic device is a Bluetooth-enabled cell phone.

4. The hand-held, portable electronic device, as set forth in claim 1, wherein said first retaining structure is configured to mate with said metal connector of said first attachable wireless headset such that frictional forces developed by the contact are sufficient to maintain the metal connector in place after detachably latching said first attachable wireless headset and said second retaining structure is configured to mate with said metal connector of said second attachable wireless headset such that frictional forces developed by the contact are sufficient to maintain the metal connector in place after detachably latching said second attachable wireless headset.

5. A hand-held, portable electronic device for use with a stereo pair of left and right wireless pairing headsets, configured for consumer wearing by a wireless user, and each including an electrical connector and a battery, the hand-held, portable electronic device comprising:

a device body having first and second distal ends; and a first retainer including a first electrical connector, said first retainer defines a first headset retaining structure formed on said first distal end of said device body for storing said left wireless pairing headset substantially external to said device body of said hand-held, portable electronic device, said first electrical connector is configured to mate with said electrical connector of said left wireless pairing headset, and a second retainer including a second electrical connector, said second retainer defines a second headset retaining structure formed on said second distal end of said device body for storing said right wireless pairing headset substantially external to said device body of said hand-held, portable electronic device, said second electrical connector is configured to mate with said electrical connector of said right wireless pairing headset, wherein said hand-held, portable electronic device includes a first transceiver adapted to communicate with said left and right wireless pairing headsets over a wireless communication link on a personal area network using a device-to-device short range radio frequency transmission through an air interface medium, each of said left and right wireless pairing headsets including a second transceiver adapted to communicate with said hand-held, portable electronic device using said wireless communication link on the personal area network using the device-to-device short range radio frequency transmission through the air interface medium, wherein said first retainer to receive said electrical connector of said left wireless pairing headset which provides charge for in situ charging thereof at said hand-held, portable electronic device, wherein said left wireless pairing headset is stored for reuse when physically connected to said hand-held, portable electronic device, wherein said second retainer to receive said electrical connector of said right wireless pairing headset which provides charge for in situ charging thereof at said hand-held, portable electronic device, wherein said right wireless pairing headset is stored for reuse when physically connected to said hand-held, portable electronic device, wherein said electrical connector of said left wireless pairing headset is a first Universal Serial Bus (USB) connector such that the first electrical connector of the first retainer is configured to accept the first USB connector of the left wireless pairing headset, and wherein said electrical connector of said right wireless pairing headset is a second Universal Serial Bus (USB) connector such that the second electrical connector of the second retainer is configured to accept the second USB connector of the right wireless pairing headset.

6. The hand-held, portable electronic device, as set forth in claim 5, wherein each of said left and right wireless pairing headsets is a handsfree attachable earphone including at least one of a speaker and a microphone and said hand-held, portable electronic device is a cell phone that includes at least one of a digital music player, a personal digital assistant, a global positioning satellite receiver, a video player, and a pocket personal computer.

7. The hand-held, portable electronic device, as set forth in claim 5, wherein said second transceiver of each of said left and right wireless pairing headsets is adapted to communicate with said first transceiver of said hand-held, portable electronic device using a Bluetooth protocol for a short-range wireless communication associated with the wireless user, said hand-held, portable electronic device is a Bluetooth-enabled cell phone.

8. The hand-held, portable electronic device, as set forth in claim 5, wherein said first electrical connector is a first power pin socket to receive a power pin of said electrical connector of said left wireless pairing headset for in situ charging thereof at said hand-held, portable electronic device and wherein said second electrical connector is a second power pin socket to receive a power pin of said electrical connector of said right wireless pairing headset for in situ charging thereof at said hand-held, portable electronic device.

9. The hand-held, portable electronic device, as set forth in claim 8, wherein said electrical connector of said left wireless pairing headset enables said left wireless pairing headset to receive charge at said first power pin socket of said hand-held, portable electronic device and wherein said electrical connector of said right wireless pairing headset enables said right wireless pairing headset to receive charge at said second power pin socket of said hand-held, portable electronic device.

10. The hand-held, portable electronic device, as set forth in claim 5, wherein each of said first and second USB connectors having a male connector portion such that said first headset retaining structure is configured to accept said male connector portion of said first USB connector which extends away from said left wireless pairing headset and wherein said second headset retaining structure is configured to accept said male connector portion of said second USB connector which extends away from said right wireless pairing headset.

11. The hand-held, portable electronic device, as set forth in claim 5, further comprising:
a device battery; and
a charge circuitry for charging said device battery and said battery of said left wireless pairing headset and said battery of said right wireless pairing headset.

12. The hand-held, portable electronic device, as set forth in claim 5, wherein said first headset retaining structure is configured to mate with said electrical connector of said left wireless pairing headset such that frictional forces developed by the contact are sufficient to maintain said electrical connector of said left wireless pairing headset in place after detachably latching to said left wireless pairing headset and wherein said second headset retaining structure is configured to mate with said electrical connector of said right wireless pairing headset such that frictional forces developed by the contact are sufficient to maintain said electrical connector of said right wireless pairing headset in place after detachably latching to said right wireless pairing headset.

13. The hand-held, portable electronic device, as set forth in claim 5, further comprising:
a device housing,
wherein said first headset retaining structure is configured to receive said electrical connector of said left wireless pairing headset for storing said left wireless pairing headset substantially external to said device body of said hand-held, portable electronic device by keeping said left wireless pairing headset substantially outside of said device housing,
wherein said second headset retaining structure is configured to receive said electrical connector of said right wireless pairing headset for storing said right wireless pairing headset substantially external to said device body of said hand-held, portable electronic device by keeping said right wireless pairing headset substantially outside of said device housing.

14. The hand-held, portable electronic device, as set forth in claim 13, wherein said first distal end of the device body is on a left side of the device body such that said first retainer is configured and arranged to receive said left wireless pairing headset substantially straight along the left side of the hand-held, portable electronic device and said second distal end of the device body is on a right side of the device body such that said second retainer is configured and arranged to receive said right wireless pairing headset substantially straight along the right side of the hand-held, portable electronic device.

15. A hand-held, portable electronic device for use with first and second wireless pairing headsets each of which including an integrated electrical connector and a battery, the hand-held, portable electronic device comprising:
a device body;
a device battery;
a charge circuitry for charging said device battery and said battery of said first wireless pairing headset and said battery of said second wireless pairing headset;
a first electrical connector that is configured to mate with said electrical connector of said first wireless pairing headset; and
a second electrical connector that is configured to mate with said electrical connector of said second wireless pairing headset,
wherein said hand-held, portable electronic device includes one or more transceivers adapted to wirelessly communicate with said first and second wireless pairing headsets, each of said first and second wireless pairing headsets including a second transceiver adapted to wirelessly communicate with said one or more transceivers of said hand-held, portable electronic device,
wherein said first electrical connector to provide charge for in situ charging of said first wireless pairing headset at said hand-held, portable electronic device,
wherein said second electrical connector to provide charge for in situ charging of said second wireless pairing headset at said hand-held, portable electronic device,
wherein said electrical connector of said first wireless pairing headset is a first Universal Serial Bus (USB) type connector such that the first electrical connector of the first retainer is configured to accept the first USB type connector of the first wireless pairing headset, and
wherein said electrical connector of said second wireless pairing headset is a second Universal Serial Bus (USB) type connector such that the second electrical connector of the second retainer is configured to accept the second USB type connector of the second wireless pairing headset.

16. The hand-held, portable electronic device, as set forth in claim 15, wherein said first electrical connector is configured to mate with said electrical connector of said first wireless pairing headset such that frictional forces developed by the contact are sufficient to maintain said electrical connector of said first wireless pairing headset in place after detachably latching to said first wireless pairing headset and wherein said second electrical connector is configured to mate with said electrical connector of said second wireless pairing headset such that frictional forces developed by the contact are sufficient to maintain said electrical connector of said second wireless pairing headset in place after detachably latching to said second wireless pairing headset.

17. The hand-held, portable electronic device, as set forth in claim 15, further comprising:
a device housing,
wherein said first electrical connector is configured to receive said electrical connector of said first wireless pairing headset for storing said first wireless pairing headset substantially external to said device body of said hand-held, portable electronic device by keeping said first wireless pairing headset substantially outside of said device housing,
wherein said second electrical connector is configured to receive said electrical connector of said second wireless pairing headset for storing said second wireless pairing headset substantially external to said device body of said hand-held, portable electronic device by keeping said second wireless pairing headset substantially outside of said device housing.

18. The hand-held, portable electronic device, as set forth in claim 17, wherein the device body having first and second sides such that said first electrical connector is disposed on the first side of the device body to receive said first wireless pairing headset substantially on the first side of the hand-held, portable electronic device and said second electrical connector is disposed on the second side of the device body to receive said second wireless pairing headset substantially on the second side of the hand-held, portable electronic device.

19. The hand-held, portable electronic device, as set forth in claim 15, wherein each of said first and second wireless pairing headsets is a handsfree attachable earphone including at least one of a speaker and a microphone and said hand-held, portable electronic device is a cell phone that includes at least one of a digital music player, a personal digital assistant, a global positioning satellite receiver, a video player, and a pocket personal computer.

20. The hand-held, portable electronic device, as set forth in claim 15, wherein said first electrical connector is a first power pin socket to receive a power pin of said electrical connector of said first wireless pairing headset for in situ charging thereof at said hand-held, portable electronic device and wherein said second electrical connector is a second power pin socket to receive a power pin of said electrical connector of said second wireless pairing headset for in situ charging thereof at said hand-held, portable electronic device.

* * * * *